(12) United States Patent
Ikeda et al.

(10) Patent No.: US 10,274,698 B2
(45) Date of Patent: Apr. 30, 2019

(54) ZOOM LENS AND IMAGING APPARATUS

(71) Applicant: FUJIFILM Corporation, Tokyo (JP)

(72) Inventors: Shinkichi Ikeda, Saitama (JP); Takuya Tanaka, Saitama (JP)

(73) Assignee: FUJIFILM Corporation, Tokyo (JP)

(\*) Notice: Subject to any disclaimer, the term of this patent is extended or adjusted under 35 U.S.C. 154(b) by 0 days.

(21) Appl. No.: 15/879,463

(22) Filed: Jan. 25, 2018

(65) Prior Publication Data

US 2018/0217360 A1 Aug. 2, 2018

(30) Foreign Application Priority Data

Jan. 27, 2017 (JP) ................. 2017-012817

(51) Int. Cl.
*G02B 15/14* (2006.01)
*G02B 9/60* (2006.01)
*G02B 13/02* (2006.01)
*G02B 15/173* (2006.01)

(52) U.S. Cl.
CPC ............ *G02B 9/60* (2013.01); *G02B 13/02* (2013.01); *G02B 15/14* (2013.01); *G02B 15/173* (2013.01)

(58) Field of Classification Search
CPC ........ G02B 9/60; G02B 15/173; G02B 13/02; G02B 15/14
See application file for complete search history.

(56) References Cited

U.S. PATENT DOCUMENTS 7,864,445 B2 1/2011 Shirasuna
8,988,786 B2 \* 3/2015 Shimomura ......... G02B 15/173
359/683

FOREIGN PATENT DOCUMENTS

JP 2009-288619 A 12/2009
JP 2013-221998 A 10/2013
JP 2015-230449 A 12/2015

\* cited by examiner

*Primary Examiner* — Joseph P Martinez
(74) *Attorney, Agent, or Firm* — Studebaker & Brackett PC

(57) ABSTRACT

The zoom lens consists of, in order from an object side: a first lens group that remains stationary during zooming and has a positive refractive power; at least two movable lens groups that are moved during zooming; and a final lens group that remains stationary during zooming and has a positive refractive power. The first lens group consists of, in order from the object side, a first-a lens group that remains stationary during focusing and has a negative refractive power, a first-b lens group that is moved during focusing and has a positive refractive power, and a first-c lens group that remains stationary during focusing and has a positive refractive power. The first-a lens group consists of, in order from the object side, a first lens that has a negative refractive power, a second lens that is convex toward the object side and has a positive refractive power, and a third lens that has a negative refractive power. At least one of the first lens or the third lens satisfies a predetermined conditional expression, and the entire system satisfies the other predetermined conditional expressions.

14 Claims, 21 Drawing Sheets

FIG. 1
EXAMPLE 1
WIDE-ANGLE END
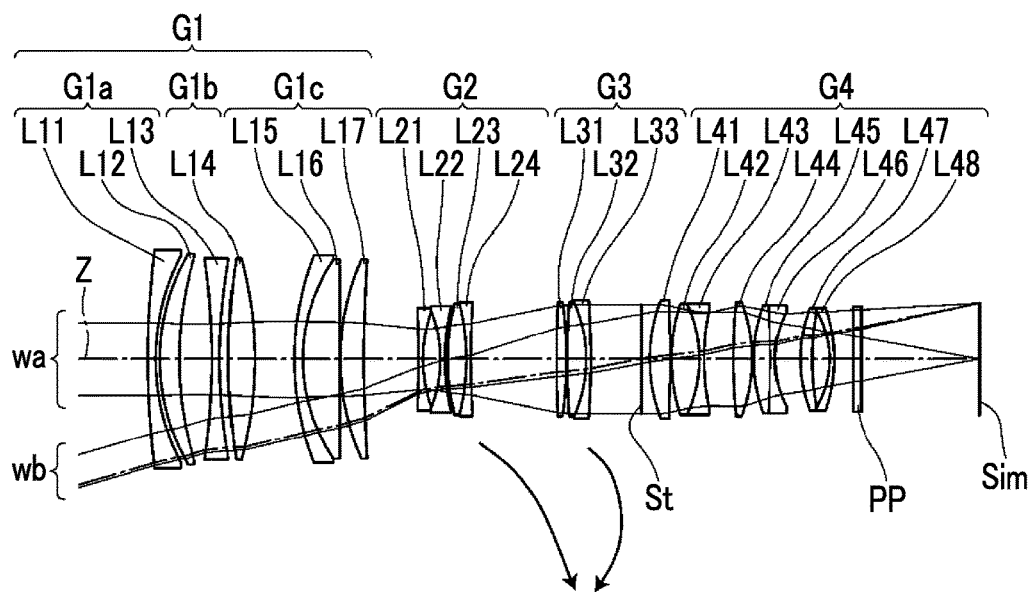
TELEPHOTO END
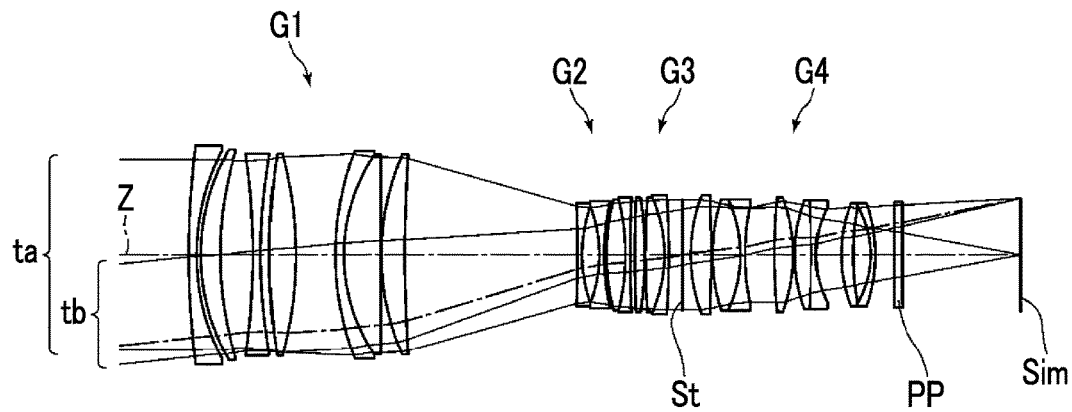

FIG. 2
EXAMPLE 2
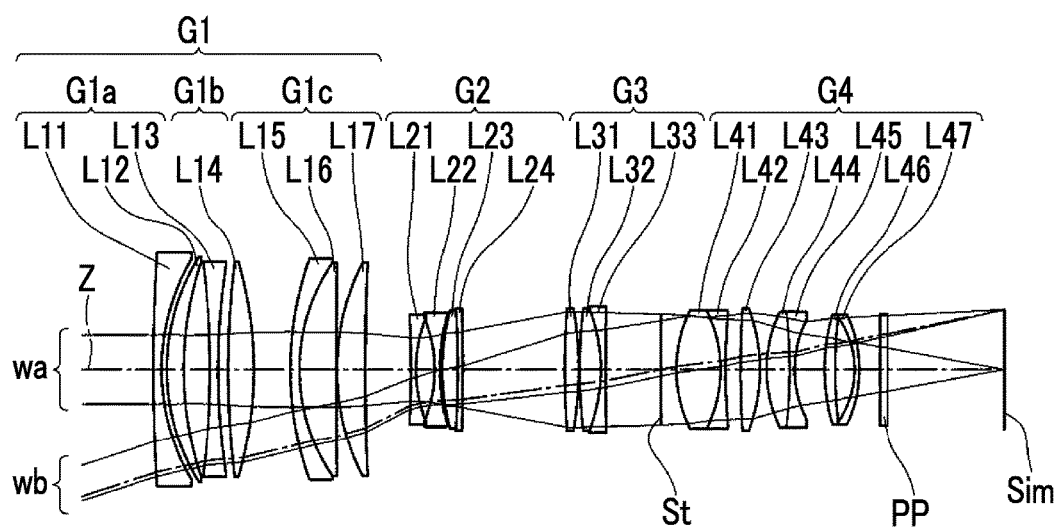
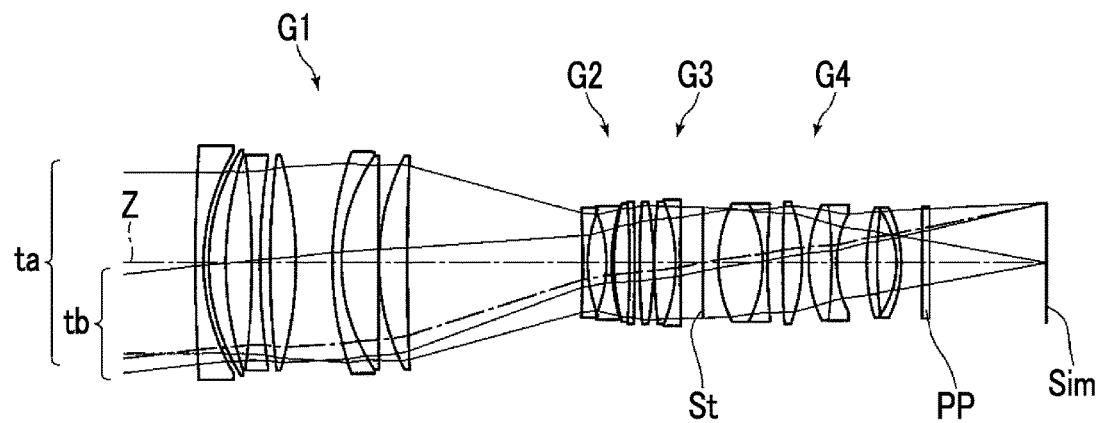

FIG. 3
EXAMPLE 3
WIDE-ANGLE END
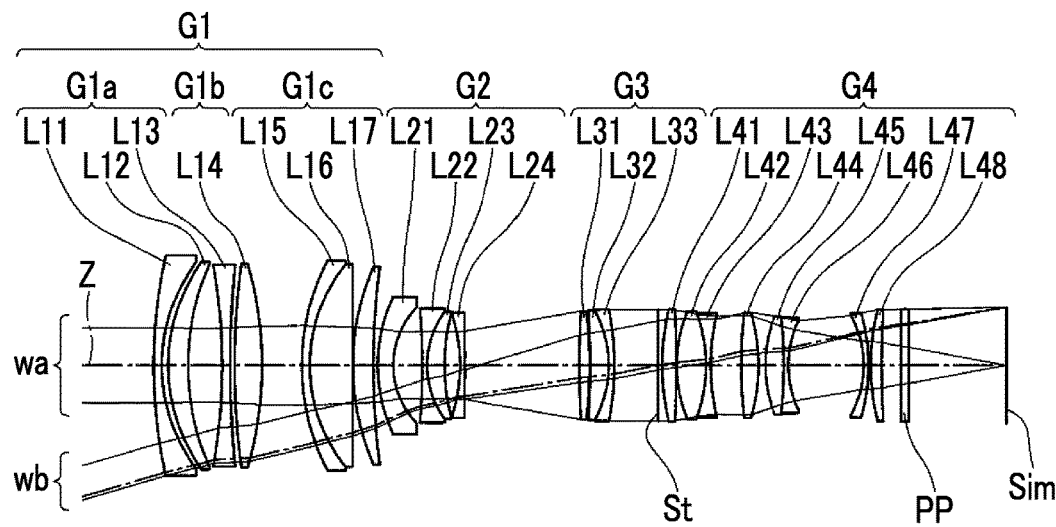
TELEPHOTO END
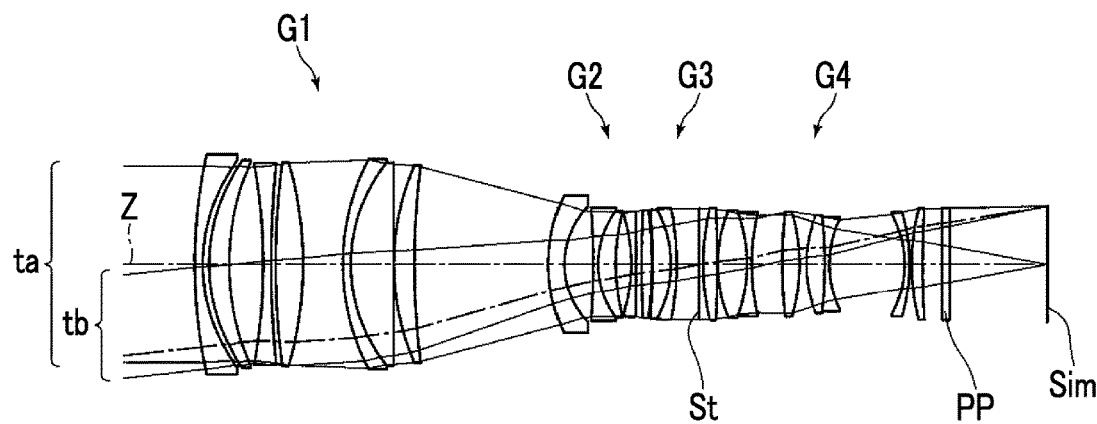

FIG. 4
EXAMPLE 4
WIDE-ANGLE END
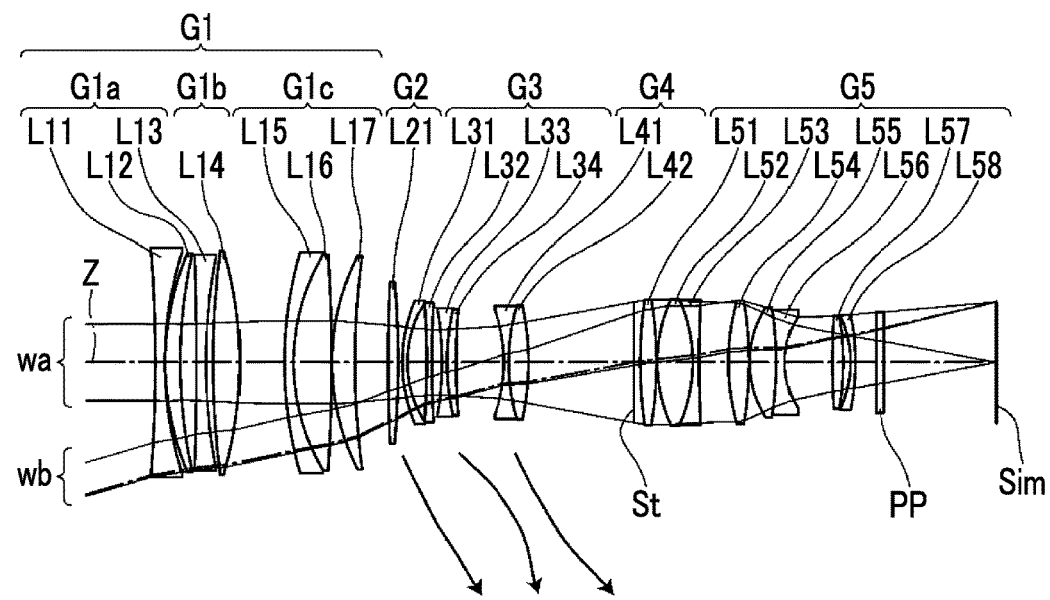
TELEPHOTO END
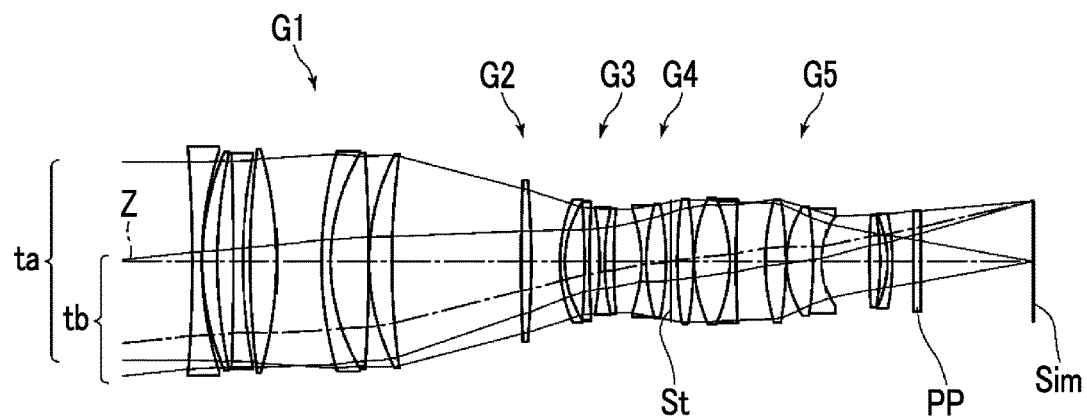

FIG. 5
EXAMPLE 5
WIDE-ANGLE END
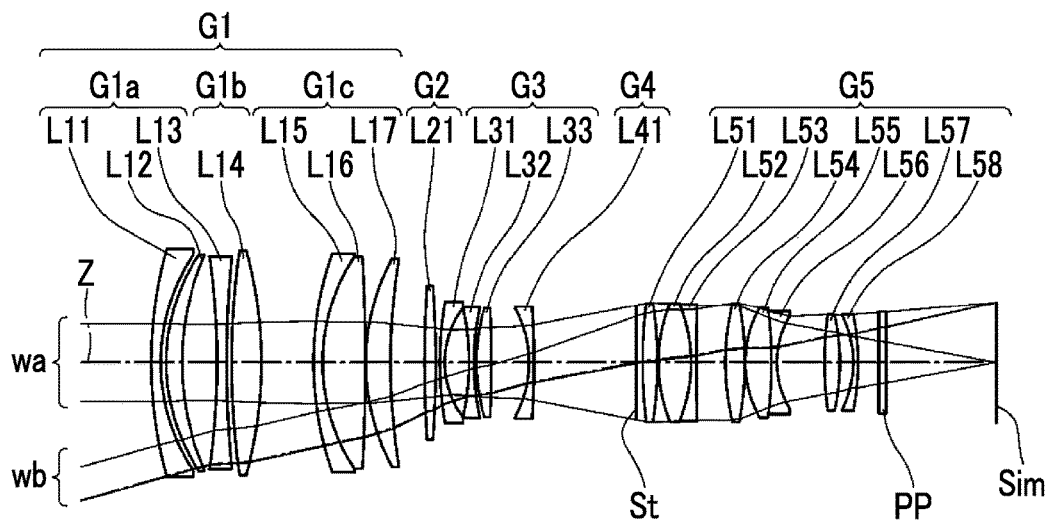
TELEPHOTO END
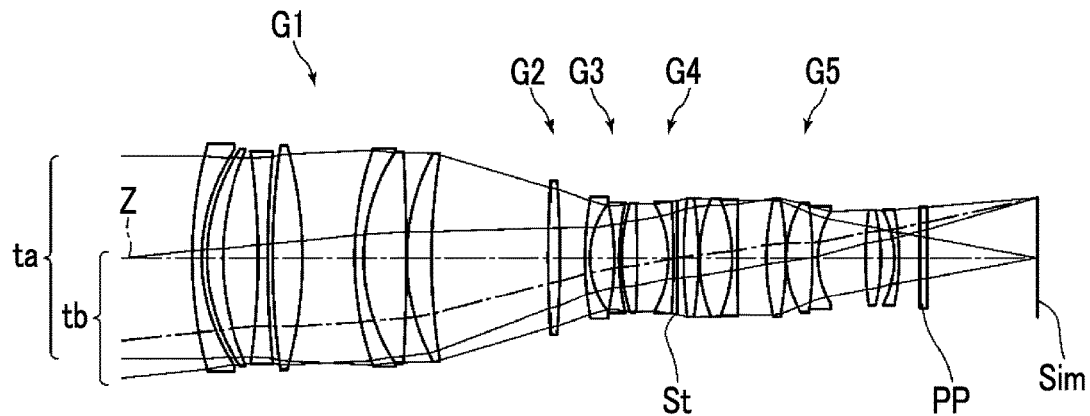

FIG. 6
EXAMPLE 6
WIDE-ANGLE END
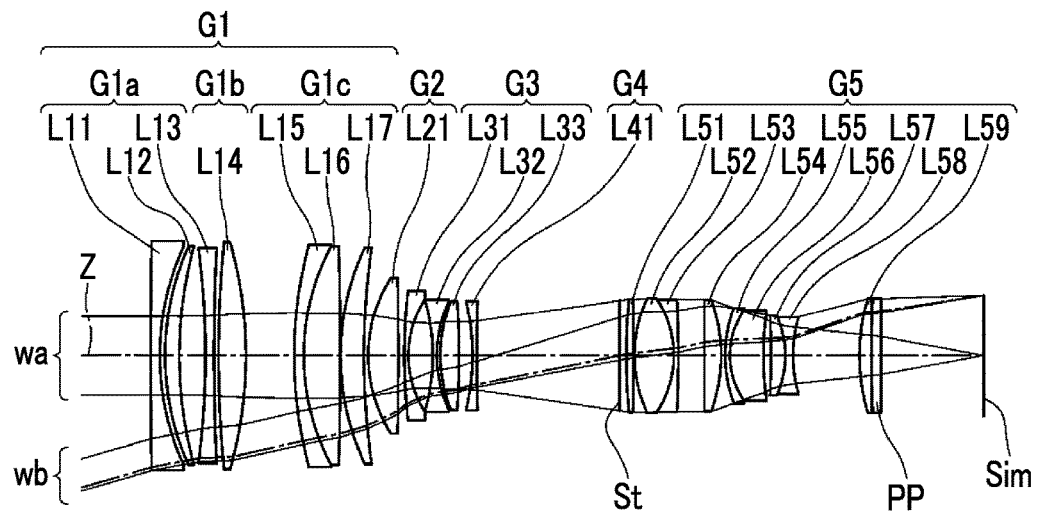
TELEPHOTO END
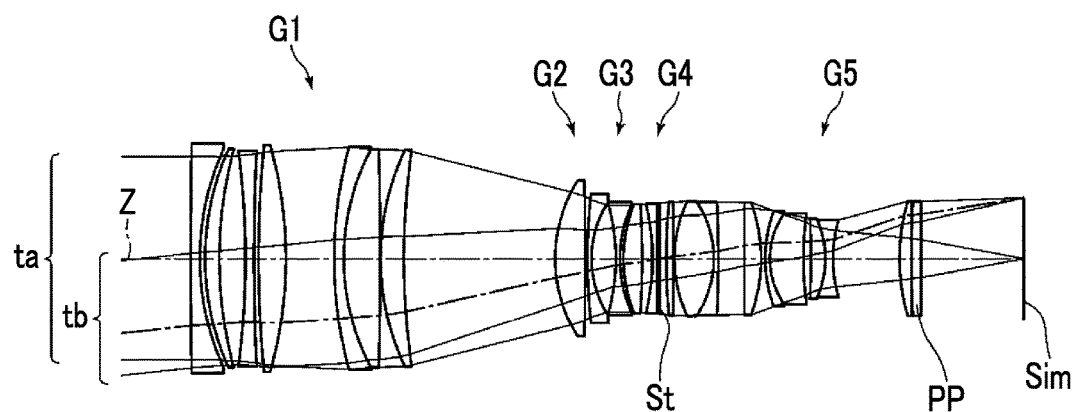

FIG. 7
EXAMPLE 7
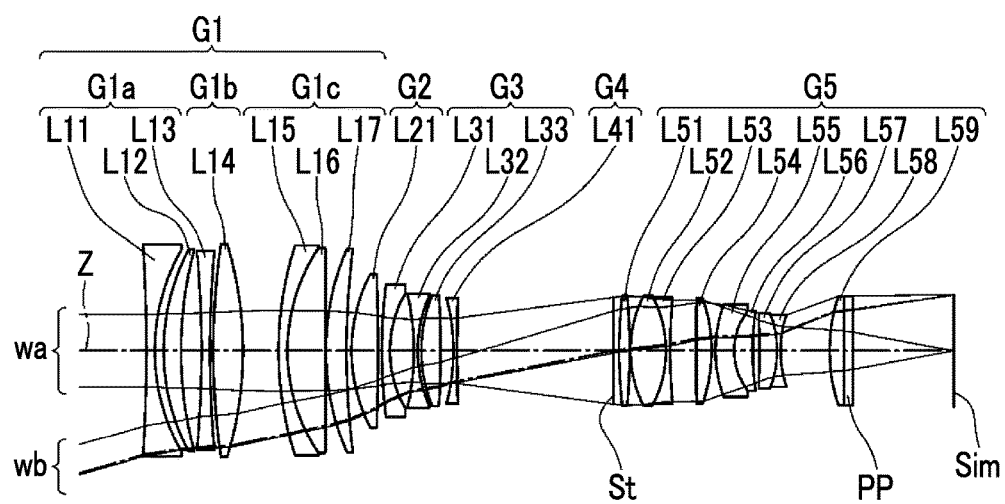
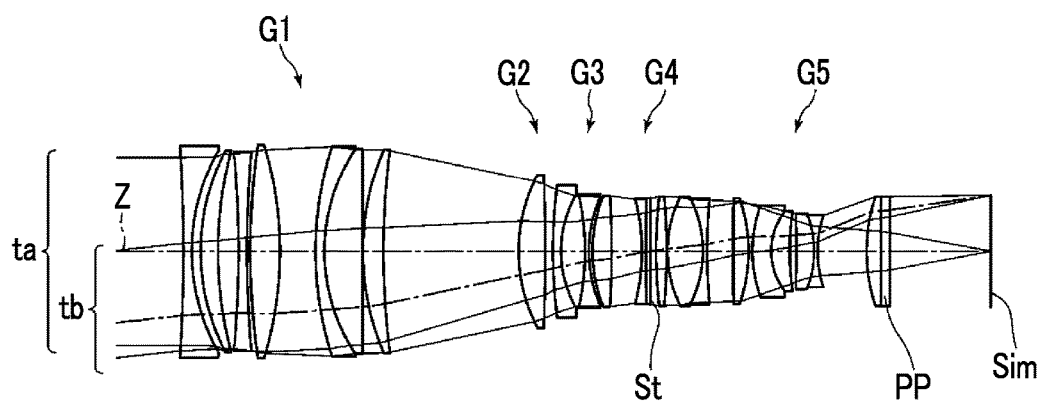

FIG. 8
EXAMPLE 8
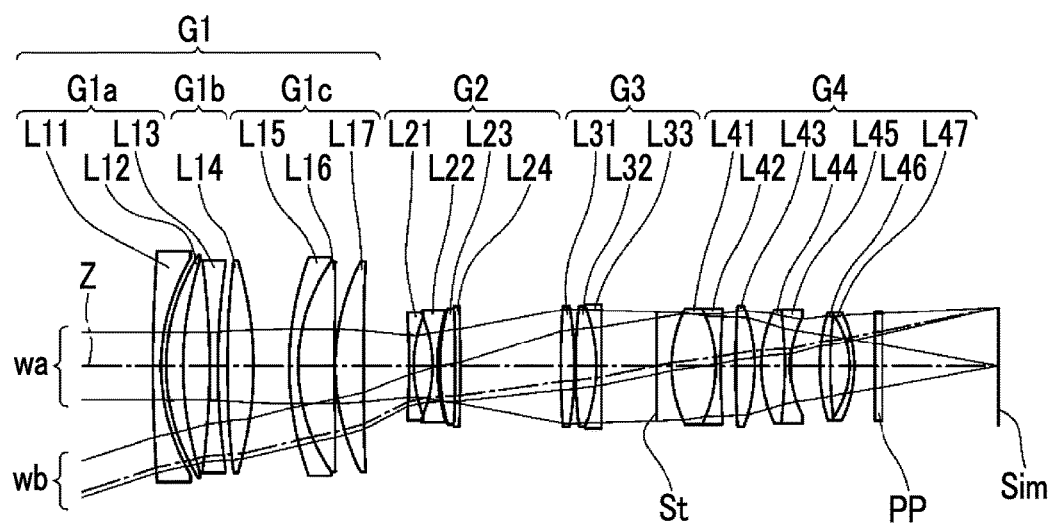
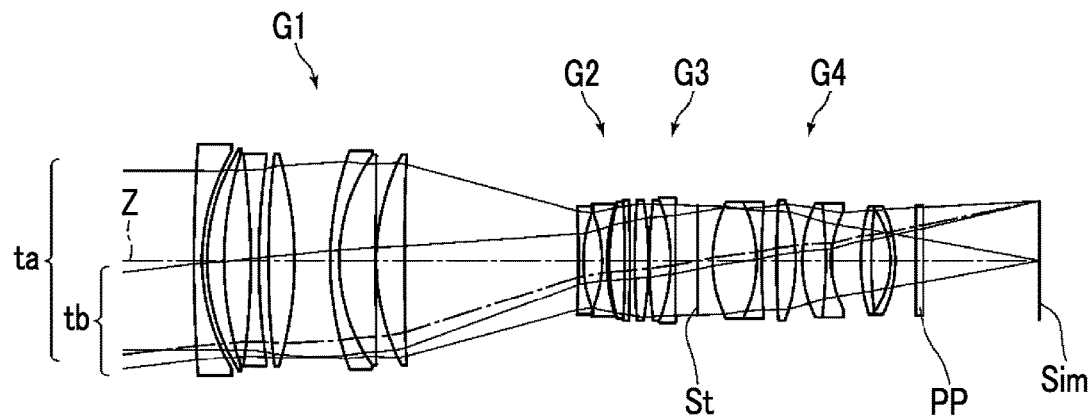

FIG. 9
EXAMPLE 9
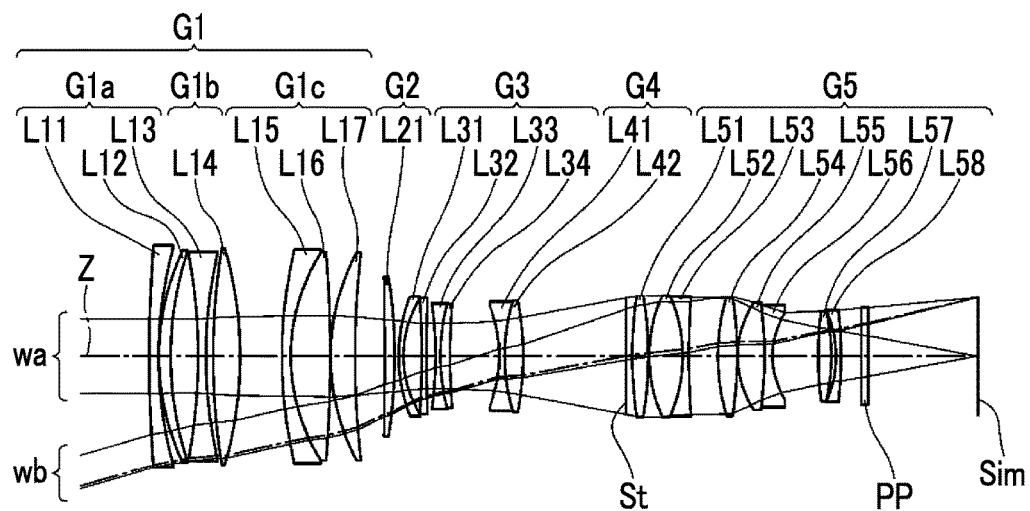
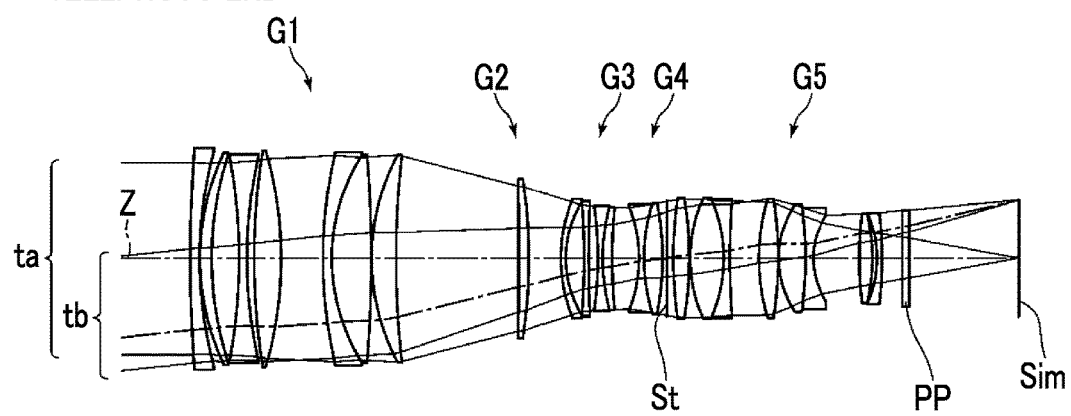

FIG. 10
EXAMPLE 10
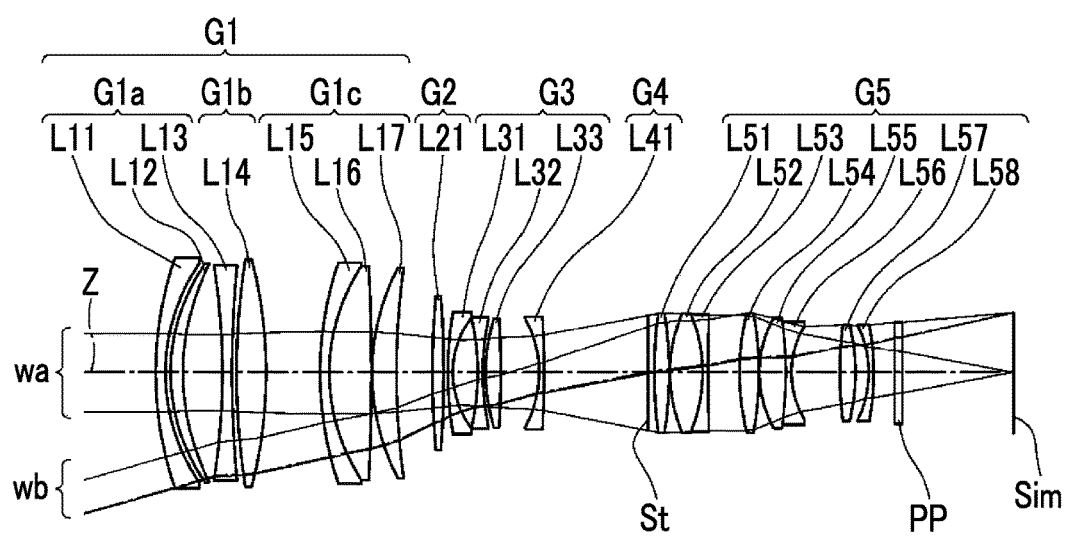
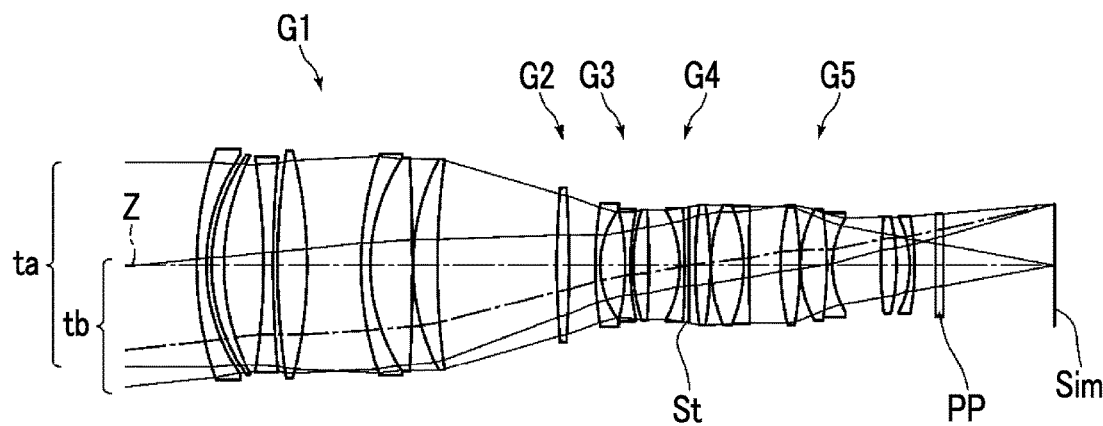

EXAMPLE 1

EXAMPLE 2

ZOOM LENS AND IMAGING APPARATUS

CROSS REFERENCE TO RELATED APPLICATIONS

The present application claims priority under 35 U.S.C. § 119 to Japanese Patent Application No. 2017-012817 filed on Jan. 27, 2017. The above application is hereby expressly incorporated by reference, in its entirety, into the present application.

BACKGROUND OF THE INVENTION

1. Field of the Invention

The present invention relates to a zoom lens suitable for electronic cameras such as movie imaging cameras, broadcast cameras, digital cameras, video cameras, and surveillance cameras, and to an imaging apparatus comprising the zoom lens.

2. Description of the Related Art

As zoom lenses used in electronic cameras such as movie imaging cameras, broadcast cameras, digital cameras, video cameras, and surveillance cameras, zoom lenses disclosed in JP2009-288619A, JP2013-221998A, and JP2015-230449A have been proposed.

SUMMARY OF THE INVENTION

In imaging apparatuses such as movie imaging cameras and broadcast cameras, there is a demand for a zoom lens that is compact and lightweight but has favorable optical performance. In particular, reduction in size and reduction in weight are strongly demanded for imaging modes focusing on maneuverability and operability.

At the time of capturing a moving image, it is demanded that the change in angle of view during focusing is small. In order to suppress the change in angle of view, there has been proposed a method of performing focusing by using the following configuration: the first lens group closest to the object side, which remains stationary, is divided into a plurality of sub-lens groups, and some of the sub-lens groups therein move during zooming. However, in this case, since the number of lenses of the first lens group having a large outer diameter increases, it becomes difficult to reduce the size and weight.

As the focal length increases, the change in angle of view tends to increase. Therefore, it becomes more difficult to suppress the change in the angle of view during focusing while maintaining a small size, a light weight, and high image quality.

In the lens system described in JP2009-288619A, the change in angle of view during focusing is not sufficiently small. In addition, it can not be said that both of the lens systems described in JP2013-221998A and JP2015-230449A are sufficiently miniaturized and lightweighted as compared with the level demanded in recent years.

The present invention has been made in consideration of the above-mentioned situation, and its object is to provide a zoom lens, for which reduction in size and weight is achieved and high optical performance is achieved while the change in angle of view during focusing is suppressed, and an imaging apparatus which comprises the zoom lens.

A zoom lens of the present invention consists of, in order from an object side: a first lens group that remains stationary with respect to an image plane during zooming and has a positive refractive power; at least two movable lens groups that are moved by changing distances between the movable lens groups and adjacent groups in a direction of an optical axis during zooming; and a final lens group that remains stationary with respect to the image plane during zooming and has a positive refractive power. The first lens group consists of, in order from the object side, a first-a lens group that has a negative refractive power and remains stationary with respect to the image plane during focusing, a first-b lens group that has a positive refractive power and is moved by changing a distance in the direction of the optical axis between the first-b lens group and an adjacent lens group during focusing, and a first-c lens group that has a positive refractive power and remains stationary with respect to the image plane during focusing. The first-a lens group consists of, in order from the object side, a first lens that has a negative refractive power, a second lens that is convex toward the object side and has a positive refractive power, and a third lens that has a negative refractive power. Assuming that a specific gravity of the lens having the negative refractive power in the first-a lens group is Gv1an and an Abbe number of the lens having the negative refractive power in the first-a lens group at a d line is Nud1an, at least one of the first lens or the third lens satisfies Conditional Expression (1).

$$0.03 < Gv1an/Nud1an < 0.06 \quad (1)$$

Assuming that a focal length of the first-c lens group is f1c and a focal length of the first lens group is f1, Conditional Expression (2) is satisfied.

$$0.8 < f1c/f1 < 1 \quad (2)$$

It is preferable that at least one of the first lens or the third lens satisfies Conditional Expression (1-1).

$$0.032 < Gv1an/Nud1an < 0.045 \quad (1\text{-}1)$$

It is preferable that Conditional Expression (2-1) is satisfied.

$$0.9 < f1c/f1 < 0.96 \quad (2\text{-}1)$$

In the zoom lens of the present invention, it is preferable that assuming that a focal length of the first-a lens group is f1a and a focal length of the first-b lens group is f1b, Conditional Expression (3) is satisfied.

$$-0.9 < f1a/f1b < -0.5 \quad (3)$$

It is preferable that Conditional Expression (3-1) is satisfied.

$$-0.79 < f1a/f1b < -0.67 \quad (3\text{-}1)$$

It is preferable that assuming that a focal length of the first-a lens group is f1a, Conditional Expression (4) is satisfied.

$$-1.5 < f1a/f1 < -0.8 \quad (4)$$

It is preferable that Conditional Expression (4-1) is satisfied.

$$-1.2 < f1a/f1 < -1 \quad (4\text{-}1)$$

It is preferable that assuming that a focal length of the first lens is f1a1 and a focal length of the first-a lens group is f1a, Conditional Expression (5) is satisfied.

$$0.9 < f1a1/f1a < 1.9 \quad (5)$$

It is preferable that Conditional Expression (5-1) is satisfied.

$$1.02 < f1a1/f1a < 1.63 \quad (5\text{-}1)$$

It is preferable that assuming that an average value of dn/dt as a temperature coefficient of a refractive index of the lens having the negative refractive power in the first-a lens group at the d line is G1an_ave_dn, Conditional Expression (6) is satisfied.

$$-1.5 < G1an\_ave\_dn < 3.8 \tag{6}$$

It is preferable that Conditional Expression (6-1) is satisfied.

$$-1 < G1an\_ave\_dn < 3 \tag{6-1}$$

However, assuming that the relative refractive index of the lens with respect to air at the d line at 40° C. is nd40 ($\times 10^{-6}$) and the relative refractive index of the lens with respect to air at the d line at 0° C. is nd0 ($\times 10^{-6}$), dn/dt (unit: $10^{-6}$/K) is represented by the following expression.

$$dn/dt = (nd40 - nd0)/40$$

The at least two movable lens groups may consist of, in order from the object side, a second lens group that has a negative refractive power and a third lens group that has a positive refractive power. The at least two movable lens groups may consist of, in order from the object side, a second lens group that has a positive refractive power, a third lens group that has a negative refractive power, and a fourth lens group that has a negative refractive power.

An imaging apparatus of the present invention comprises the above-mentioned zoom lens of the present invention.

It should be noted that the term "consists of ~" means that the imaging lens may include not only the above-mentioned elements but also lenses substantially having no powers, optical elements, which are not lenses, such as a stop, a mask, a cover glass, and a filter, and mechanism parts such as a lens flange, a lens barrel, an imaging element, and a hand shaking correction mechanism.

Further, surface shapes and reference signs of refractive powers of the lenses are assumed as those in paraxial regions in a case where some lenses have aspheric surfaces.

The zoom lens of the present invention consists of, in order from an object side: the first lens group that remains stationary with respect to the image plane during zooming and has a positive refractive power; the at least two movable lens groups that are moved by changing distances between the movable lens groups and adjacent groups in a direction of an optical axis during zooming; and the final lens group that remains stationary with respect to the image plane during zooming and has a positive refractive power. The first lens group consists of, in order from the object side, the first-a lens group that has a negative refractive power and remains stationary with respect to the image plane during focusing, the first-b lens group that has a positive refractive power and is moved by changing the distance in the direction of the optical axis between the first-b lens group and an adjacent lens group during focusing, and the first-c lens group that has a positive refractive power and remains stationary with respect to the image plane during focusing. The first-a lens group consists of, in order from the object side, the first lens that has a negative refractive power, the second lens that is convex toward the object side and has a positive refractive power, and the third lens that has a negative refractive power. At least one of the first lens or the third lens satisfies Conditional Expression (1) and satisfies Conditional Expression (2). Therefore, it is possible to provide a zoom lens, for which reduction in size and weight is achieved and high optical performance is achieved while the change in angle of view during focusing is suppressed, and an imaging apparatus which comprises the zoom lens.

$$0.03 < Gv1an/Nud1an < 0.06 \tag{1}$$

$$0.8 < f1c/f1 < 1 \tag{2}$$

BRIEF DESCRIPTION OF THE DRAWINGS

FIG. 1 is a cross-sectional view illustrating a lens configuration of a zoom lens (common to Example 1) according to an embodiment of the present invention.

FIG. 2 is a cross-sectional view illustrating a lens configuration of a zoom lens of Example 2 of the present invention.

FIG. 3 is a cross-sectional view illustrating a lens configuration of a zoom lens of Example 3 of the present invention.

FIG. 4 is a cross-sectional view illustrating a lens configuration of a zoom lens of Example 4 of the present invention.

FIG. 5 is a cross-sectional view illustrating a lens configuration of a zoom lens of Example 5 of the present invention.

FIG. 6 is a cross-sectional view illustrating a lens configuration of a zoom lens of Example 6 of the present invention.

FIG. 7 is a cross-sectional view illustrating a lens configuration of a zoom lens of Example 7 of the present invention.

FIG. 8 is a cross-sectional view illustrating a lens configuration of a zoom lens of Example 8 of the present invention.

FIG. 9 is a cross-sectional view illustrating a lens configuration of a zoom lens of Example 9 of the present invention.

FIG. 10 is a cross-sectional view illustrating a lens configuration of a zoom lens of Example 10 of the present invention.

DESCRIPTION OF THE PREFERRED EMBODIMENTS

Figure 11:
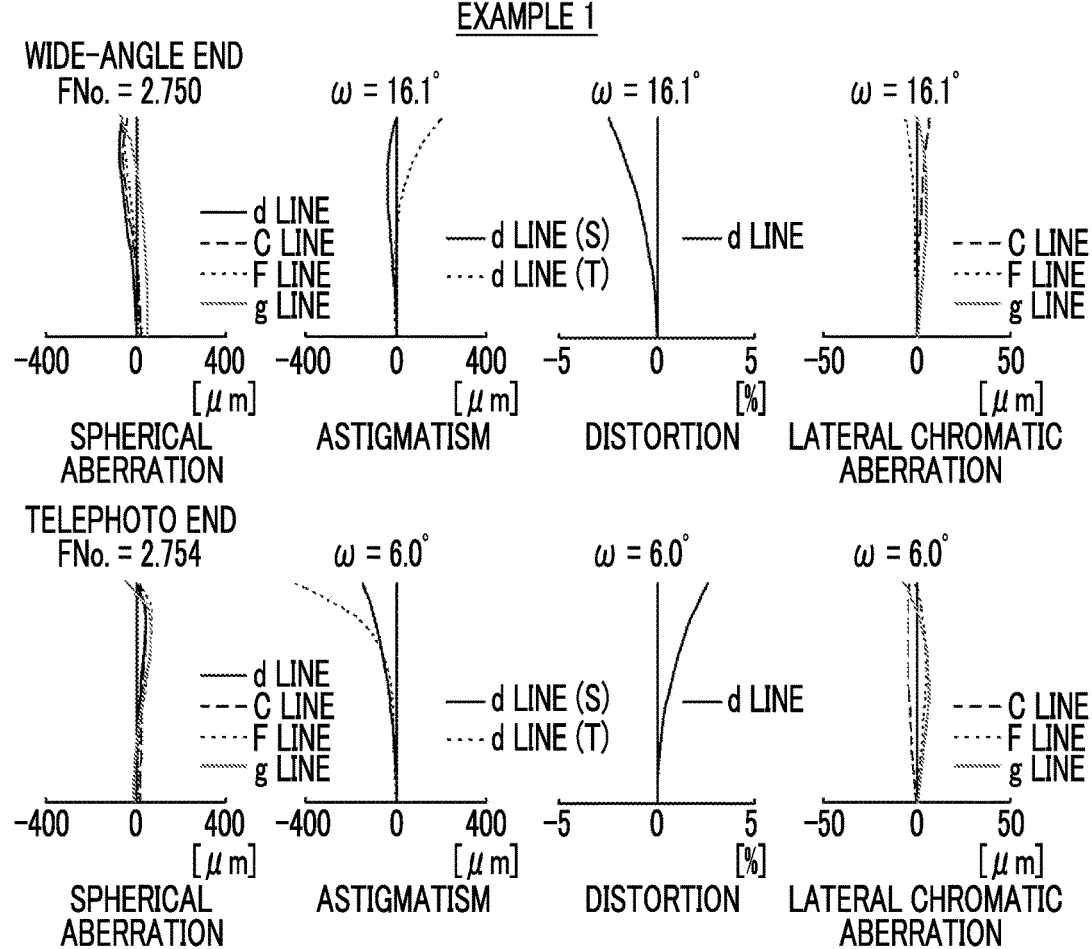
FIG. 11 is a diagram of aberrations of the zoom lens of Example 1 of the present invention.

Hereinafter, embodiments of the present invention will be described with reference to drawings. FIG. 1 is a cross-sectional view illustrating a lens configuration and an optical path of a zoom lens according to an embodiment of the present invention. In FIG. 1, aberrations in the wide-angle end state are shown in the upper part, on-axis rays wa and rays with the maximum angle of view wb are shown as rays. In addition, aberrations in the telephoto end state are shown in the lower part, and on-axis rays to and rays with the maximum angle of view tb are shown as rays. Further, loci of movement of the movable lens groups are indicated by arrows. It should be noted that the example shown in FIG. 1 corresponds to the zoom lens of Example 1 to be described later. FIG. 1 shows a state where the object at infinity is in focus, where the left side of the drawing is the object side and the right side of the drawing is the image side. It should be noted that the aperture stop St shown in the drawing does not necessarily indicate its size and shape, and indicates a position of the stop on the optical axis Z.

In order to mount the zoom lens on an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The zoom lens of the present embodiment consists of, in order from the object side: a first lens group G1 that remains stationary with respect to the image plane Sim during zooming and has a positive refractive power; at least two movable lens groups that are moved by changing distances between the movable lens groups and adjacent groups in a direction of an optical axis during zooming; and a final lens group that remains stationary with respect to the image plane Sim during zooming and has a positive refractive power. In addition, in the present embodiment, the second lens group G2 and the third lens group G3 correspond to the movable lens groups, and the fourth lens group G4 corresponds to the final lens group.

In such a manner, by forming the first lens group G1 closest to the object side as a lens group having a positive refractive power, it is possible to shorten the total length of the lens system. Further, by making the first lens group G1 closest to the object side remain stationary during zooming, it is possible to prevent the total lens length from changing during zooming. Furthermore, by forming the final lens group closest to the image side as a lens group having a positive refractive power, it is possible to suppress an increase in exit angle of the principal ray of the off-axis rays. Thus, it is possible to suppress shading.

The first lens group G1 consists of, in order from the object side, a first-a lens group G1a that has a negative refractive power and remains stationary with respect to the image plane Sim during focusing, a first-b lens group G1b that has a positive refractive power and is moved by changing a distance in the direction of the optical axis between the first-b lens group G1b and an adjacent lens group during focusing, and a first-c lens group G1c that has a positive refractive power and remains stationary with respect to the image plane Sim during focusing. With such a configuration, it is possible to suppress spherical aberration and longitudinal chromatic aberration during focusing, and it is possible to suppress fluctuation in angle of view.

The first-a lens group G1a consists of, in order from the object side, a first lens L11 that has a negative refractive power, a second lens L12 that is convex toward the object side and has a positive refractive power, and a third lens L13 that has a negative refractive power. With such a configuration, it is possible to suppress distortion and lateral chromatic aberration at the wide-angle end. Further, by arranging the second lens L12 having a positive refractive power and the third lens L13 having a negative refractive power in order from the object side, it is possible to suppress fluctuation in angle of view during focusing.

Assuming that a specific gravity of the lens having the negative refractive power in the first-a lens group G1a is Gv1an and an Abbe number of the lens having the negative refractive power in the first-a lens group G1a at the d line is Nud1an, at least one of the first lens L11 or the third lens L13 is configured to satisfy Conditional Expression (1). By satisfying Conditional Expression (1), it is possible to satisfactorily correct lateral chromatic aberration while suppressing the specific gravity of the lens. By not allowing the result of Conditional Expression (1) to be equal to or greater than the upper limit, it is possible to prevent the lens weight from increasing in a case of correcting lateral chromatic aberration. By not allowing the result of Conditional Expression (1) to be equal to or less than the lower limit, it is possible to prevent lateral chromatic aberration from being overcorrected. In addition, in a case where Conditional Expression (1-1) is satisfied, it is possible to obtain more favorable characteristics.

$$0.03 < Gv1an/Nud1an < 0.06 \quad (1)$$

$$0.032 < Gv1an/Nud1an < 0.045 \quad (1\text{-}1)$$

Assuming that the focal length of the first-c lens group G1c is f1c and the focal length of the first lens group G1 is f1, the configuration is made such that Conditional Expression (2) is satisfied. By not allowing the result of Conditional Expression (2) to be equal to or greater than the upper limit, the refractive power of the first-c lens group G1c can be prevented from becoming excessively weak. Thus, it is possible to easily reduce the sizes of the first-a lens group G1a and the first-b lens group G1b. By not allowing the result of Conditional Expression (2) to be equal to or less than the lower limit, the refractive power of the first-c lens group G1c can be prevented from becoming excessively strong. Thus, it is possible to easily suppress spherical aberration at the telephoto end. In addition, in a case where Conditional Expression (2-1) is satisfied, it is possible to obtain more favorable characteristics.

$$0.8 < f1c/f1 < 1 \quad (2)$$

$$0.9 < f1c/f1 < 0.96 \quad (2\text{-}1)$$

In the zoom lens of the present embodiment, it is preferable that assuming that a focal length of the first-a lens group G1a is f1a and a focal length of the first-b lens group G1b is f1b, Conditional Expression (3) is satisfied. By not allowing the result of Conditional Expression (3) to be equal to or greater than the upper limit, the refractive power of the first-a lens group G1a can be prevented from being excessively strong with respect to the refractive power of the first-b lens group G1b. Thus, it becomes easy to reduce the size of the first-a lens group G1a. In addition, it is possible to suppress fluctuation of the angle of view during focusing. By not allowing the result of Conditional Expression (3) to be equal to or less than the lower limit, the refractive power of the first-b lens group G1b can be prevented from becoming excessively strong. Thus, it is possible to suppress fluctuation in aberration during focusing. In addition, in a case where Conditional Expression (3-1) is satisfied, it is possible to obtain more favorable characteristics.

$$-0.9 < f1a/f1b < -0.5 \quad (3)$$

$$-0.79 < f1a/f1b < -0.67 \quad (3\text{-}1)$$

It is preferable that assuming that the focal length of the first-a lens group G1a is f1a and the focal length of the first lens group G1 is f1, Conditional Expression (4) is satisfied. By not allowing the result of Conditional Expression (4) to be equal to or greater than the upper limit, the refractive power of the first-a lens group G1a can be prevented from becoming excessively strong. Thus, it becomes easy to achieve an increase in focal length of the zoom lens. By not allowing the result of Conditional Expression (4) to be equal to or less than the lower limit, the refractive power of the first-a lens group G1a can be prevented from becoming excessively weak. Thus, it is possible to minimize the total lens length, and it is possible to suppress an increase in size of the first lens group G1. As a result, it becomes easy to achieve reduction in size and weight. In addition, in a case where Conditional Expression (4-1) is satisfied, it is possible to obtain more favorable characteristics.

$$-1.5 < f1a/f1 < -0.8 \quad (4)$$

$$-1.2 < f1a/f1 < -1 \quad (4\text{-}1)$$

It is preferable that assuming that a focal length of the first lens L11 is f1a1 and a focal length of the first-a lens group G1a is f1a, Conditional Expression (5) is satisfied. By not allowing the result of Conditional Expression (5) to be equal to or greater than the upper limit, the refractive power of the first lens L11 can be prevented from becoming excessively weak. Thus, it is possible to suppress distortion and lateral chromatic aberration at the wide-angle end. By not allowing the result of Conditional Expression (5) to be equal to or less than the lower limit, the refractive power of the first lens L11 can be prevented from becoming excessively strong. Thus, it is possible to suppress spherical aberration on the telephoto side. In addition, in a case where Conditional Expression (5-1) is satisfied, it is possible to obtain more favorable characteristics.

$$0.9 < f1a1/f1a < 1.9 \quad (5)$$

$$1.02 < f1a1/f1a < 1.63 \quad (5\text{-}1)$$

It is preferable that assuming that an average value of dn/dt as a temperature coefficient of a refractive index of the lens having the negative refractive power in the first-a lens group G1a at the d line is G1an_ave_dn, Conditional Expression (6) is satisfied. By satisfying Conditional Expression (6), it is possible to maintain high image quality on the telephoto side even at the time of temperature change. By not allowing the result of Conditional Expression (6) to be equal to or greater than the upper limit, the effect of the temperature correction at the telephoto end can be prevented from becoming insufficient. By not allowing the result of Conditional Expression (6) to be equal to or less than the lower limit, the effect of the temperature correction at the telephoto end can be prevented from becoming excessive. In addition, in a case where Conditional Expression (6-1) is satisfied, it is possible to obtain more favorable characteristics.

$$-1.5 < G1an\_ave\_dn < 3.8 \quad (6)$$

$$-1 < G1an\_ave\_dn < 3 \quad (6\text{-}1)$$

The at least two movable lens groups may consist of, in order from the object side, a second lens group G2 that has a negative refractive power and a third lens group G3 that has a positive refractive power. This configuration corresponds to Examples 1, 2, 3, and 8 (FIGS. 1, 2, 3, and 8) to be described later. In addition, the loci of movement of the movable lens groups are shown in only Example 1 (FIG. 1), and are omitted in different Examples 2, 3, and 8 (FIGS. 2, 3, and 8), and the loci of movement of the movable lens groups are the same in Examples 1, 2, 3, and 8. In such a manner, by making the refractive power of the third lens group G3 positive, it is possible to lower the off-axis ray height. Therefore, it is possible to decrease the outer diameter of the first lens group G1, and this becomes a lens configuration in which there is an advantage in reducing the size and the weight thereof. Further, it is possible to minimize the angle of incidence into the fourth lens group G4, and thus it is possible to reduce spherical aberration in the entire zooming range.

The at least two movable lens groups may consist of, in order from the object side, a second lens group G2 that has a positive refractive power, a third lens group G3 that has a negative refractive power, and a fourth lens group G4 that has a negative refractive power. This configuration corresponds to Examples 4, 5, 6, 7, 9, and 10 (FIGS. 4, 5, 6, 7, 9, and 10) to be described later. In addition, the loci of movement of the movable lens groups are shown in only Example 4 (FIG. 4), and are omitted in different Examples 5, 6, 7, 9, and 10 (FIGS. 5, 6, 7, 9, and 10), and the loci of movement of the movable lens groups are the same in Examples 4, 5, 6, 7, 9, and 10. In such a manner, by making the refractive power of the second lens group G2 positive, it is possible to lower the off-axis ray height. Therefore, it is possible to decrease the outer diameter of the first lens group G1, and this becomes a lens configuration in which there is an advantage in reducing the size and the weight thereof. The movement range of the third lens group G3 and the movement range of the fourth lens group G4 can overlap with each other. Therefore, it is possible to shorten the total length.

In the example shown in FIG. 1, the optical member PP is disposed between the lens system and the image plane Sim. However, various filters such as a lowpass filter and a filter for cutting off a specific wavelength region may not be disposed between the lens system and the image plane Sim. Instead, such various filters may be disposed between the lenses, or coating for functions the same as those of various filters may be performed on a lens surface of any lens.

Next, numerical examples of the zoom lens of the present invention will be described.

First, a zoom lens of Example 1 will be described. FIG. 1 is a cross-sectional view illustrating a lens configuration of the zoom lens of Example 1. In FIG. 1 and FIGS. 2 to 10 corresponding to Examples 2 to 10 to be described later, aberrations in the wide-angle end state are shown in the upper part, on-axis rays wa and rays with the maximum angle of view wb are shown as rays. In addition, aberrations in the telephoto end state are shown in the lower part, and on-axis rays to and rays with the maximum angle of view tb are shown as rays. Further, loci of movement of the movable lens groups are indicated by arrows. Each drawing shows a state where the object at infinity is in focus, where the left side of the drawing is the object side and the right side of the drawing is the image side. It should be noted that the aperture stop St shown in the drawing does not necessarily indicate its size and shape, and indicates a position of the stop on the optical axis Z.

The zoom lens of Example 1 is composed of, in order from the object side, a first lens group G1 having a positive refractive power, a second lens group G2 having a negative refractive power, a third lens group G3 having a positive refractive power, and a fourth lens group G4 having a positive refractive power. In addition, in the present example, the second lens group G2 and the third lens group G3 correspond to the movable lens groups, and the fourth lens group G4 corresponds to the final lens group.

The first lens group G1 is composed of seven lenses L11 to L17. The second lens group G2 is composed of four lenses L21 to L24. The third lens group G3 is composed of three lenses L31 to L33. The fourth lens group G4 is composed of eight lenses L41 to L48.

The first lens group G1 is composed of a first-a lens group G1a consisting of three lenses L11 to L13, a first-b lens group G1b consisting of only one lens L14, and a first-c lens group G1c consisting of three lenses L15 to L17.

Table 1 shows basic lens data of the zoom lens of Example 1, Table 2 shows data about specification, and Table 3 shows data about variable surface distances. Hereinafter, meanings of the reference signs in the tables are, for example, as described in Example 1, and are basically the same as those in Examples 2 to 10.

In the lens data of Table 1, the column of the surface number shows surface numbers. The surface of the elements closest to the object side is the first surface, and the surface numbers sequentially increase toward the image plane side. The column of the radius of curvature shows radii of curvature of the respective surfaces. The column of the surface distance shows distances on the optical axis Z between the respective surfaces and the subsequent surfaces. Further, the column of n shows a refractive index of each optical element at the d line (a wavelength of 587.6 nm (nanometers)), and the column of vd shows an Abbe number of each optical element at the d line (a wavelength of 587.6 nm (nanometers)).

Here, the sign of the radius of curvature is positive in a case where a surface has a shape convex toward the object side, and is negative in a case where a surface has a shape convex toward the image plane side. In the basic lens data, the aperture stop St and the optical member PP are additionally noted. In a place of a surface number of a surface corresponding to the aperture stop St, the surface number and a term of (stop) are noted. Further, in the lens data of Table 1, in each place of the surface distance which is variable during zooming, DD[surface number] is noted. Numerical values each corresponding to the DD[surface number] are shown in Table 3.

In the data about the specification of Table 2, values of the zoom ratio, the focal length f', the back focal length Bf', the F number FNo., and the total angle of view 2ω are noted.

In the basic lens data, the data about specification, and the data about variable surface distances, a degree is used as a unit of an angle, and mm (millimeters) is used as a unit of a length, but appropriate different units may be used since the optical system can be used even in a case where the system is enlarged or reduced in proportion.

TABLE 1

Example 1•Lens Data(n and v are based on d line)

| Surface Number | Radius of Curvature | Surface Distance | n | v |
|---|---|---|---|---|
| 1 | 227.53208 | 2.000 | 1.48749 | 70.24 |
| 2 | 58.06068 | 1.100 | | |
| 3 | 54.24869 | 4.999 | 1.84667 | 23.79 |
| 4 | 89.11491 | 8.536 | | |
| 5 | −183.26740 | 2.000 | 1.85150 | 40.78 |
| 6 | 145.81689 | 2.172 | | |
| 7 | 167.91090 | 6.768 | 1.49700 | 81.54 |

TABLE 1-continued

Example 1•Lens Data(n and v are based on d line)

| Surface Number | Radius of Curvature | Surface Distance | n | v |
|---|---|---|---|---|
| 8 | −99.07974 | 10.172 | | |
| 9 | 73.95686 | 2.200 | 1.84667 | 23.79 |
| 10 | 46.20207 | 9.433 | 1.43875 | 94.66 |
| 11 | ∞ | 0.200 | | |
| 12 | 63.89396 | 6.087 | 1.72916 | 54.68 |
| 13 | 399.48871 | DD[13] | | |
| 14 | −334.18732 | 1.201 | 1.90043 | 37.37 |
| 15 | 37.98668 | 4.440 | | |
| 16 | −34.45616 | 1.200 | 1.49700 | 81.54 |
| 17 | 59.68418 | 0.700 | | |
| 18 | 59.05649 | 4.820 | 1.84667 | 23.79 |
| 19 | −59.05649 | 1.200 | 1.85150 | 40.78 |
| 20 | 259.91618 | DD[20] | | |
| 21 | 383.97122 | 2.538 | 1.90366 | 31.31 |
| 22 | −102.36294 | 0.200 | | |
| 23 | 214.98722 | 4.862 | 1.60300 | 65.44 |
| 24 | −36.73949 | 1.200 | 1.71736 | 29.51 |
| 25 | −198.11620 | DD[25] | | |
| 26(Stop) | ∞ | 2.172 | | |
| 27 | 42.08259 | 5.227 | 1.56883 | 56.04 |
| 28 | −421.05708 | 0.393 | | |
| 29 | 46.57231 | 7.179 | 1.43875 | 94.66 |
| 30 | −34.00142 | 1.201 | 1.85025 | 30.05 |
| 31 | 59.79695 | 7.569 | | |
| 32 | 146.12182 | 4.807 | 1.84667 | 23.79 |
| 33 | −42.10362 | 0.400 | | |
| 34 | 39.90271 | 4.318 | 1.60300 | 65.44 |
| 35 | −240.42306 | 1.200 | 1.95375 | 32.32 |
| 36 | 26.81888 | 6.525 | | |
| 37 | 36.79585 | 3.000 | 1.90366 | 31.31 |
| 38 | 67.98562 | 4.525 | | |
| 39 | −24.57063 | 1.200 | 1.51633 | 64.14 |
| 40 | −39.43088 | 5.000 | | |
| 41 | ∞ | 2.000 | 1.51633 | 64.14 |
| 42 | ∞ | 30.658 | | |

TABLE 2

Example 1•Specification (d Line)

| | Wide-Angle End | Telephoto End |
|---|---|---|
| Zoom Ratio | 1.0 | 2.6 |
| f' | 51.501 | 134.933 |
| Bf' | 36.976 | 36.976 |
| FNo. | 2.750 | 2.754 |
| 2ω [°] | 32.2 | 12.0 |

TABLE 3

Example 1•Variable Surface Distance

| | Wide-Angle End | Telephoto End |
|---|---|---|
| DD[13] | 14.039 | 44.630 |
| DD[20] | 22.245 | 1.243 |
| DD[25] | 13.006 | 3.417 |

FIG. 11 shows aberration diagrams of the zoom lens of Example 1. In addition, in order from the upper left side of FIG. 11, spherical aberration, astigmatism, distortion, and lateral chromatic aberration at the wide-angle end are shown. In order from the lower left side of FIG. 11, spherical aberration, astigmatism, distortion, and lateral chromatic aberration at the telephoto end are shown. Such aberration diagrams show aberrations in a state where the object distance is set as an infinite distance. The aberration diagrams illustrating spherical aberration, astigmatism, and distortion indicate aberrations that occur in a case where the d line (a wavelength of 587.6 nm (nanometers)) is set as a reference wavelength. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberrations in sagittal and tangential directions are respectively indicated by the solid line and the short dashed line. In the lateral chromatic aberration diagram, aberrations at the C line (a wavelength of 656.3 nm (nanometers)), the F line (a wavelength of 486.1 nm (nanometers)), and the g line (a wavelength of 435.8 nm (nanometers)) are respectively indicated by the long dashed line, the short dashed line, and the gray solid line. In addition, in the spherical aberration diagram, FNo. means an F number. In the other aberration diagrams, ω means a half angle of view.

Figure 12:
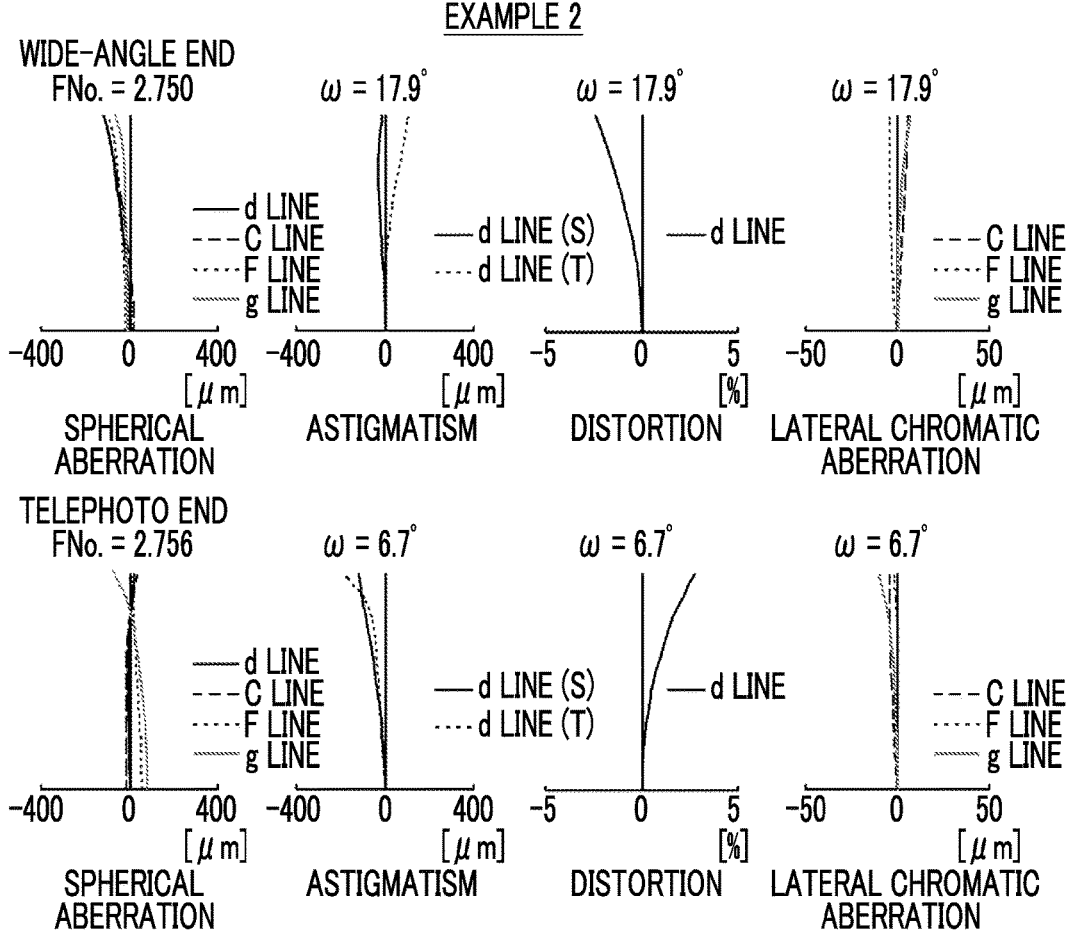
FIG. 12 is a diagram of aberrations of the zoom lens of Example 2 of the present invention.

Next, a zoom lens of Example 2 will be described. FIG. 2 is a cross-sectional view illustrating a lens configuration of the zoom lens of Example 2. Compared with the zoom lens of Example 1, the zoom lens of Example 2 is the same in terms of a configuration of the refractive power of each group and a configuration of the number of lenses of each group except that the fourth lens group G4 is composed of seven lenses L41 to L47. Further, Table 4 shows basic lens data of the zoom lens of Example 2, Table 5 shows data about specification, and Table 6 shows data about variable surface distances. FIG. 12 shows aberration diagrams thereof

TABLE 4

Example 2•Lens Data(n and ν are based on d line)

| Surface Number | Radius of Curvature | Surface Distance | n | ν |
|---|---|---|---|---|
| 1 | 444.09255 | 2.000 | 1.48749 | 70.24 |
| 2 | 52.74249 | 1.277 | | |
| 3 | 51.60553 | 4.074 | 1.84667 | 23.79 |
| 4 | 82.16037 | 6.492 | | |
| 5 | −192.52874 | 2.000 | 1.83481 | 42.72 |
| 6 | 164.76639 | 2.437 | | |
| 7 | 213.97971 | 6.245 | 1.49700 | 81.54 |
| 8 | −91.34810 | 8.821 | | |
| 9 | 79.05562 | 2.200 | 1.84667 | 23.79 |
| 10 | 45.42169 | 8.968 | 1.43875 | 94.66 |
| 11 | 3885.55273 | 0.121 | | |
| 12 | 56.53743 | 6.889 | 1.72916 | 54.68 |
| 13 | 623.26062 | DD[13] | | |
| 14 | −236.74725 | 1.201 | 1.91082 | 35.25 |
| 15 | 33.97322 | 4.547 | | |
| 16 | −32.31626 | 1.259 | 1.49700 | 81.54 |
| 17 | 49.03995 | 0.537 | | |
| 18 | 53.16990 | 3.803 | 1.89286 | 20.36 |
| 19 | −223.44243 | 1.210 | 1.85478 | 24.80 |
| 20 | −545.46043 | DD[20] | | |
| 21 | 188.34121 | 3.368 | 1.95375 | 32.32 |
| 22 | −87.65364 | 0.200 | | |
| 23 | 124.41235 | 5.152 | 1.59282 | 68.62 |
| 24 | −40.49428 | 1.200 | 1.78472 | 25.68 |
| 25 | 2078.18432 | DD[25] | | |
| 26(Stop) | ∞ | 3.704 | | |
| 27 | 32.47074 | 10.709 | 1.43875 | 94.66 |
| 28 | −31.91695 | 1.201 | 1.73400 | 51.47 |
| 29 | 152.33524 | 3.659 | | |
| 30 | 229.76082 | 4.671 | 1.66680 | 33.05 |
| 31 | −42.20381 | 1.625 | | |
| 32 | 31.94310 | 5.743 | 1.60300 | 65.44 |
| 33 | −109.17735 | 1.200 | 1.91082 | 35.25 |
| 34 | 26.09253 | 7.246 | | |
| 35 | 45.09147 | 2.586 | 1.90366 | 31.31 |
| 36 | 111.38681 | 4.689 | | |
| 37 | −22.26014 | 1.201 | 1.48749 | 70.24 |
| 38 | −30.51955 | 5.000 | | |
| 39 | ∞ | 2.000 | 1.51633 | 64.14 |
| 40 | ∞ | 28.387 | | |

TABLE 5

Example 2•Specification (d Line)

| | Wide-Angle End | Telephoto End |
|---|---|---|
| Zoom Ratio | 1.0 | 2.6 |
| f' | 46.018 | 120.568 |
| Bf | 34.706 | 34.706 |
| FNo. | 2.750 | 2.756 |
| 2ω [°] | 35.8 | 13.4 |

TABLE 6

Example 2•Variable Surface Distance

| | Wide-Angle End | Telephoto End |
|---|---|---|
| DD[13] | 11.064 | 42.471 |
| DD[20] | 24.681 | 1.208 |
| DD[25] | 13.393 | 5.459 |

Figure 13:
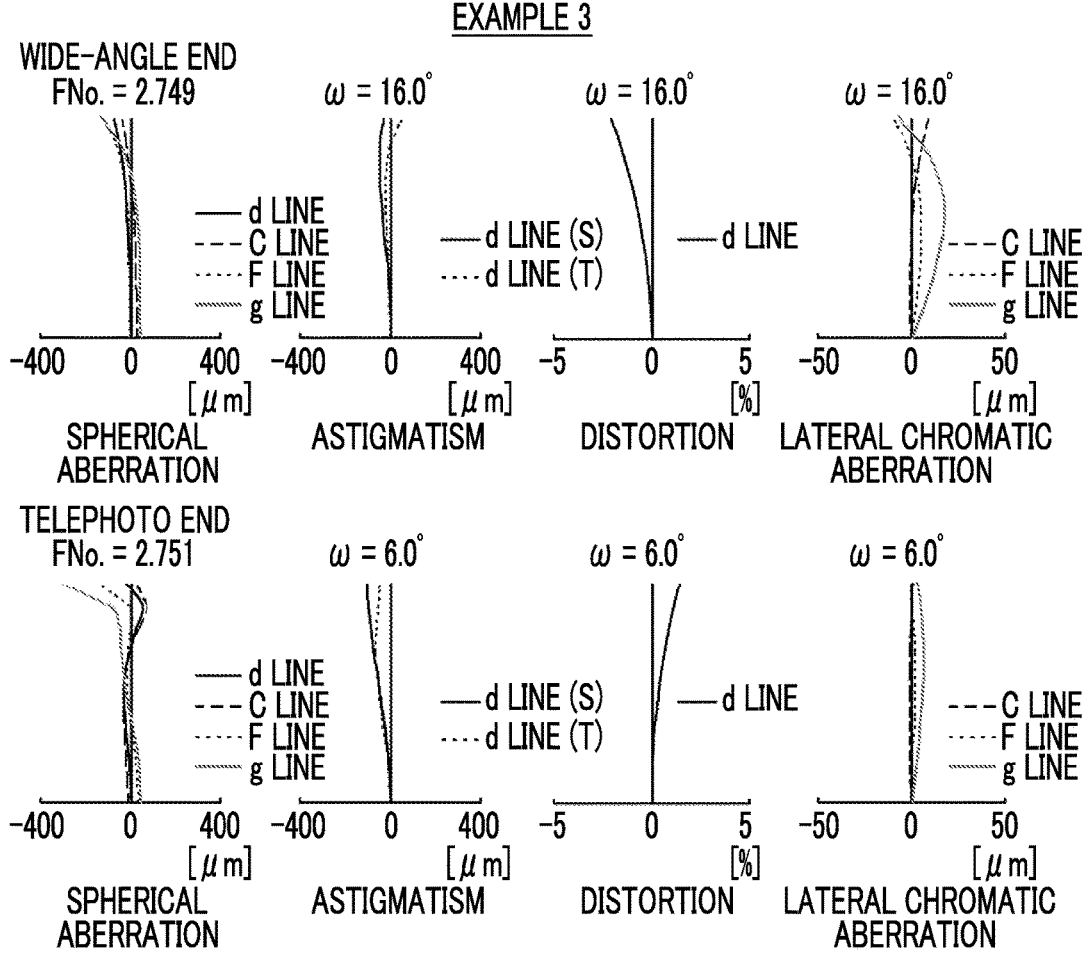
FIG. 13 is a diagram of aberrations of the zoom lens of Example 3 of the present invention.

Next, a zoom lens of Example 3 will be described. FIG. 3 is a cross-sectional view illustrating a lens configuration of the zoom lens of Example 3. Compared with Example 1, the zoom lens of Example 3 is the same in terms of a configuration of the refractive power of each group and a configuration of the number of lenses of each group. Further, Table 7 shows basic lens data of the zoom lens of Example 3, Table 8 shows data about specification, and Table 9 shows data about variable surface distances. FIG. 13 shows aberration diagrams thereof.

TABLE 7

Example 3•Lens Data(n and ν are based on d line)

| Surface Number | Radius of Curvature | Surface Distance | n | ν |
|---|---|---|---|---|
| 1 | 127.00423 | 2.000 | 1.48749 | 70.24 |
| 2 | 42.66604 | 1.598 | | |
| 3 | 43.69414 | 5.000 | 1.85896 | 22.73 |
| 4 | 60.69499 | 8.663 | | |
| 5 | −140.21011 | 2.000 | 1.80100 | 34.97 |
| 6 | 256.99090 | 1.081 | | |
| 7 | 187.17279 | 6.870 | 1.49700 | 81.54 |
| 8 | −91.67863 | 9.929 | | |
| 9 | 56.56356 | 2.000 | 1.84667 | 23.79 |
| 10 | 40.25739 | 10.649 | 1.43875 | 94.66 |
| 11 | 14734.22239 | 0.120 | | |
| 12 | 62.01141 | 5.105 | 1.60300 | 65.44 |
| 13 | 191.54358 | DD[13] | | |
| 14 | 40.26894 | 3.886 | 1.48749 | 70.24 |
| 15 | 20.70202 | 7.214 | | |
| 16 | −173.50486 | 1.210 | 1.49700 | 81.54 |
| 17 | 22.41667 | 4.377 | 1.85025 | 30.05 |
| 18 | 51.00575 | 3.859 | | |
| 19 | −41.17250 | 1.200 | 1.75500 | 52.32 |
| 20 | −785.22816 | DD[20] | | |
| 21 | 256.65707 | 2.525 | 1.83400 | 37.16 |

TABLE 7-continued

Example 3•Lens Data(n and v are based on d line)

| Surface Number | Radius of Curvature | Surface Distance | n | v |
|---|---|---|---|---|
| 22 | −109.07337 | 0.200 | | |
| 23 | −168.05819 | 4.581 | 1.48749 | 70.24 |
| 24 | −28.32645 | 1.410 | 1.59270 | 35.31 |
| 25 | −72.20608 | DD[25] | | |
| 26(Stop) | ∞ | 1.017 | | |
| 27 | 59.43515 | 3.508 | 1.56883 | 56.04 |
| 28 | −317.75521 | 0.120 | | |
| 29 | 35.05890 | 7.299 | 1.43875 | 94.66 |
| 30 | −37.96163 | 1.200 | 1.85025 | 30.05 |
| 31 | 55.43706 | 7.623 | | |
| 32 | 119.41579 | 4.297 | 1.84667 | 23.79 |
| 33 | −45.52911 | 1.752 | | |
| 34 | 32.86120 | 4.683 | 1.62230 | 53.17 |
| 35 | −116.67145 | 1.200 | 1.95375 | 32.32 |
| 36 | 26.07586 | 18.796 | | |
| 37 | −25.76438 | 1.200 | 1.48749 | 70.24 |
| 38 | −46.44353 | 0.563 | | |
| 39 | 55.84867 | 2.706 | 1.95375 | 32.32 |
| 40 | 205.12590 | 5.000 | | |
| 41 | ∞ | 2.000 | 1.51633 | 64.14 |
| 42 | ∞ | 24.408 | | |

TABLE 8

Example 3•Specification (d Line)

| | Wide-Angle End | Telephoto End |
|---|---|---|
| Zoom Ratio | 1.0 | 2.6 |
| f | 51.488 | 134.899 |
| Bf | 30.726 | 30.726 |
| FNo. | 2.749 | 2.751 |
| 2ω [°] | 32.0 | 12.0 |

TABLE 9

Example 3•Variable Surface Distance

| | Wide-Angle End | Telephoto End |
|---|---|---|
| DD[13] | 1.094 | 33.547 |
| DD[20] | 28.570 | 1.424 |
| DD[25] | 10.937 | 5.629 |

Next, a zoom lens of Example 4 will be described. FIG. 4 is a cross-sectional view illustrating a lens configuration of the zoom lens of Example 4.

The zoom lens of Example 4 is composed of, in order from the object side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power. In addition, in the present example, the second lens group G2, the third lens group G3, and the fourth lens group G4 correspond to the movable lens groups, and the fifth lens group G5 corresponds to the final lens group.

The first lens group G1 is composed of seven lenses L11 to L17. The second lens group G2 is composed of only one lens L21. The third lens group G3 is composed of four lenses L31 to L34. The fourth lens group G4 is composed of two lenses L41 and L42. The fifth lens group G5 is composed of eight lenses L51 to L58.

The first lens group G1 is composed of a first-a lens group G1a consisting of three lenses L11 to L13, a first-b lens group G1b consisting of only one lens L14, and a first-c lens group G1c consisting of three lenses L15 to L17.

Figure 14:
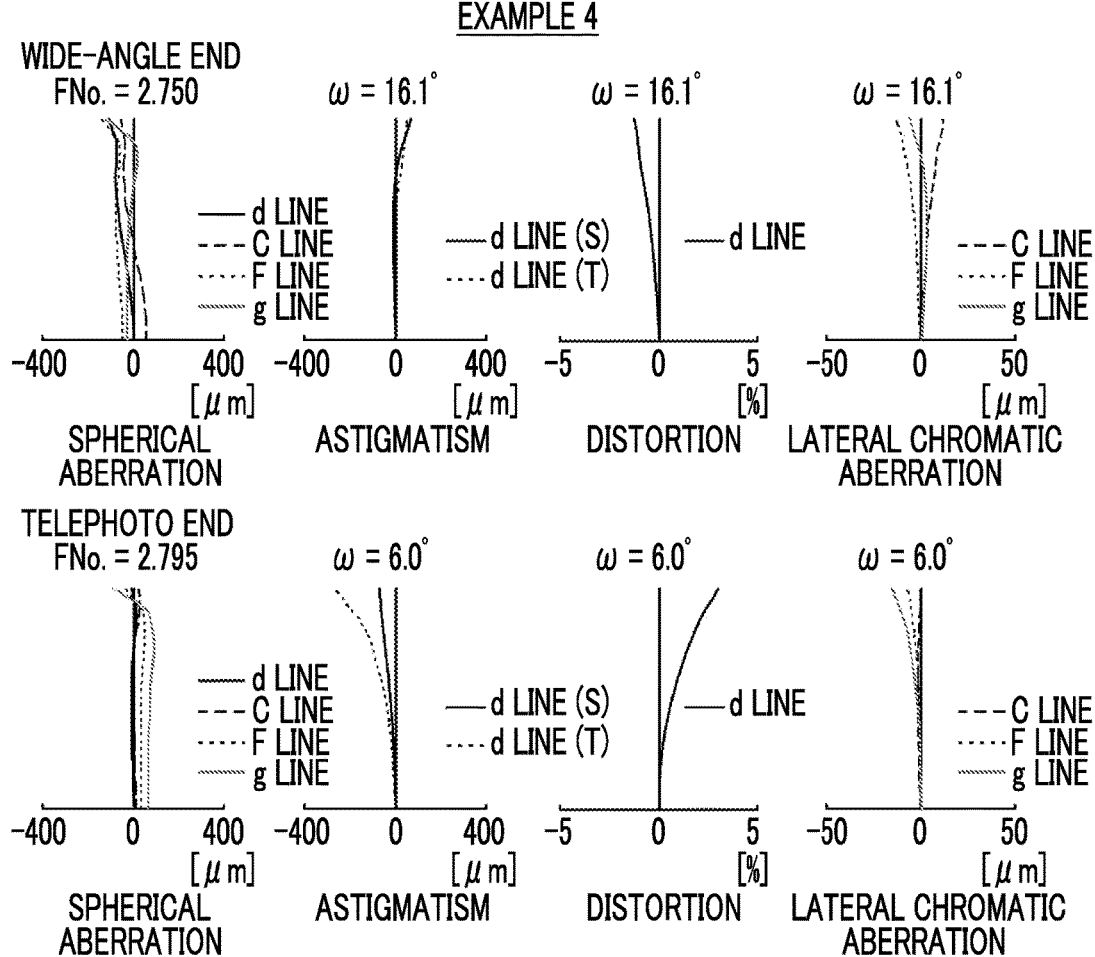
FIG. 14 is a diagram of aberrations of the zoom lens of Example 4 of the present invention.

Further, Table 10 shows basic lens data of the zoom lens of Example 4, Table 11 shows data about specification, and Table 12 shows data about variable surface distances. FIG. 14 shows aberration diagrams thereof.

TABLE 10

Example 4•Lens Data(n and v are based on d line)

| Surface Number | Radius of Curvature | Surface Distance | n | v |
|---|---|---|---|---|
| 1 | −351.60418 | 2.300 | 1.48749 | 70.24 |
| 2 | 87.03799 | 0.120 | | |
| 3 | 67.61306 | 3.582 | 1.85896 | 22.73 |
| 4 | 119.92087 | 3.925 | | |
| 5 | −676.63823 | 2.300 | 1.91082 | 35.25 |
| 6 | 128.88468 | 1.820 | | |
| 7 | 208.42536 | 6.366 | 1.43875 | 94.66 |
| 8 | −96.09062 | 10.616 | | |
| 9 | 95.17770 | 2.200 | 1.80518 | 25.42 |
| 10 | 51.01858 | 9.136 | 1.43875 | 94.66 |
| 11 | −409.46788 | 0.120 | | |
| 12 | 56.51940 | 5.507 | 1.77250 | 49.60 |
| 13 | 189.31203 | DD[13] | | |
| 14 | 409.55538 | 2.424 | 1.43875 | 94.66 |
| 15 | −229.77588 | DD[15] | | |
| 16 | 37.50405 | 1.200 | 1.49700 | 81.54 |
| 17 | 26.09863 | 4.698 | | |
| 18 | −179.58155 | 1.200 | 1.84763 | 43.24 |
| 19 | 222.69320 | 2.449 | | |
| 20 | −72.50144 | 1.210 | 1.59522 | 67.73 |
| 21 | 56.79431 | 2.194 | 1.84666 | 23.78 |
| 22 | 159.83989 | DD[22] | | |
| 23 | −36.19722 | 1.200 | 1.90043 | 37.37 |
| 24 | 47.96737 | 4.749 | 1.80518 | 25.43 |
| 25 | −64.37202 | DD[25] | | |
| 26(Stop) | ∞ | 1.550 | | |
| 27 | 102.59444 | 3.913 | 1.56883 | 56.04 |
| 28 | −93.22223 | 0.200 | | |
| 29 | 36.43889 | 8.532 | 1.49700 | 81.54 |
| 30 | −36.57060 | 1.500 | 1.80518 | 25.42 |
| 31 | 280.95233 | 7.050 | | |
| 32 | 53.20417 | 4.981 | 1.84667 | 23.79 |
| 33 | −89.76146 | 0.120 | | |
| 34 | 24.27137 | 6.406 | 1.60311 | 60.64 |
| 35 | −84.42265 | 2.000 | 1.95375 | 32.32 |
| 36 | 19.55041 | 11.494 | | |
| 37 | 179.55567 | 2.586 | 1.62004 | 36.26 |
| 38 | −68.02772 | 1.769 | | |
| 39 | −26.81778 | 1.201 | 1.78800 | 47.37 |
| 40 | −56.73936 | 5.000 | | |
| 41 | ∞ | 2.000 | 1.51633 | 64.14 |
| 42 | ∞ | 27.093 | | |

TABLE 11

Example 4•Specification (d Line)

| | Wide-Angle End | Telephoto End |
|---|---|---|
| Zoom Ratio | 1.0 | 2.6 |
| f | 50.732 | 132.917 |
| Bf | 33.411 | 33.411 |
| FNo. | 2.750 | 2.795 |
| 2ω [°] | 32.2 | 12.0 |

TABLE 12

Example 4•Variable Surface Distance

| | Wide-Angle End | Telephoto End |
|---|---|---|
| DD[13] | 7.955 | 31.053 |
| DD[15] | 1.001 | 7.082 |

TABLE 12-continued

Example 4•Variable Surface Distance

|  | Wide-Angle End | Telephoto End |
|---|---|---|
| DD[22] | 11.594 | 6.625 |
| DD[25] | 25.324 | 1.114 |

Figure 15:
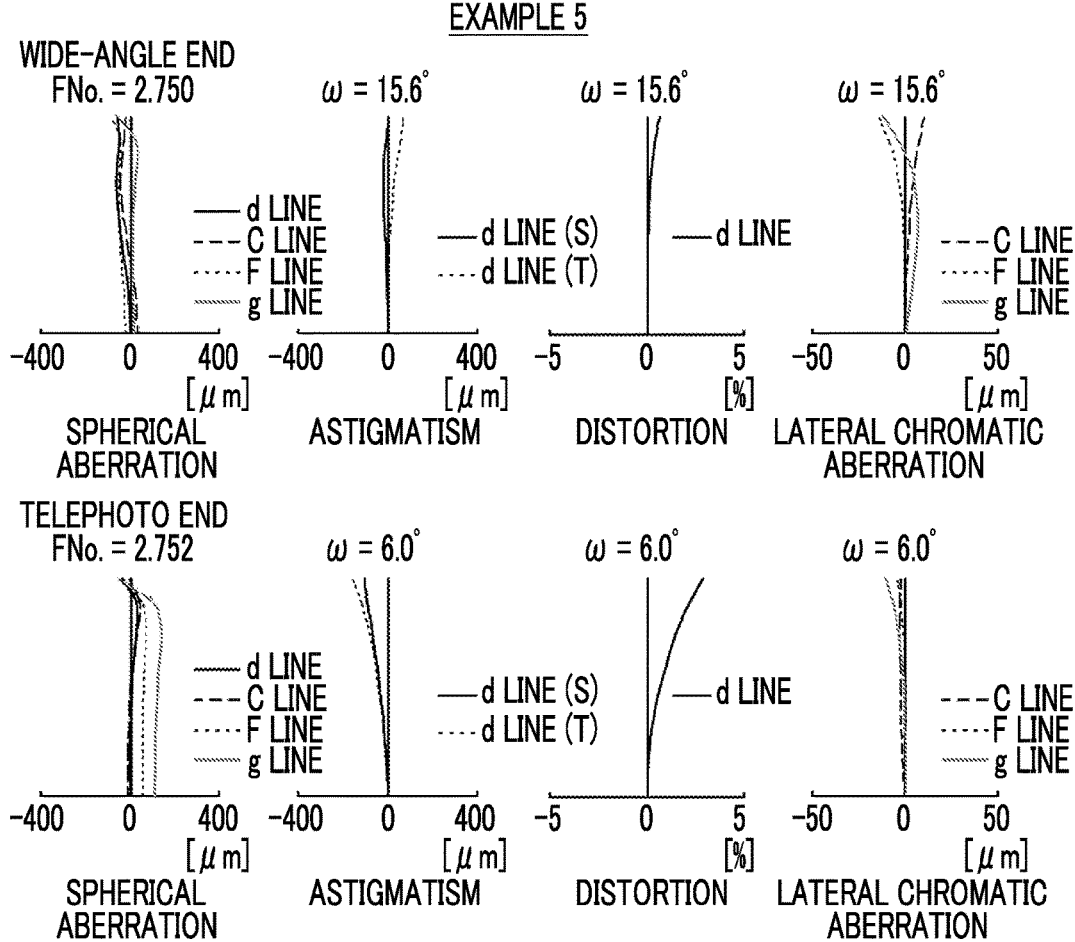
FIG. 15 is a diagram of aberrations of the zoom lens of Example 5 of the present invention.

Next, a zoom lens of Example 5 will be described. FIG. 5 is a cross-sectional view illustrating a lens configuration of the zoom lens of Example 5. Compared with the zoom lens of Example 4, the zoom lens of Example 5 is the same in terms of a configuration of the refractive power of each group and a configuration of the number of lenses of each group except that the third lens group G3 is composed of three lenses L31 to L33 and the fourth lens group G4 is composed of only a lens L41. Further, Table 13 shows basic lens data of the zoom lens of Example 5, Table 14 shows data about specification, and Table 15 shows data about variable surface distances. FIG. 15 shows aberration diagrams thereof.

TABLE 13

Example 5•Lens Data(n and ν are based on d line)

| Surface Number | Radius of Curvature | Surface Distance | n | ν |
|---|---|---|---|---|
| 1 | 101.58186 | 2.300 | 1.48749 | 70.24 |
| 2 | 46.93448 | 1.345 | | |
| 3 | 46.65810 | 3.841 | 1.80809 | 22.76 |
| 4 | 63.76593 | 8.588 | | |
| 5 | −178.82703 | 2.300 | 1.91082 | 35.25 |
| 6 | 262.87038 | 1.206 | | |
| 7 | 194.77054 | 7.181 | 1.43875 | 94.66 |
| 8 | −101.68079 | 12.585 | | |
| 9 | 78.64071 | 2.200 | 1.80518 | 25.42 |
| 10 | 46.58638 | 10.307 | 1.43875 | 94.66 |
| 11 | −463.38032 | 0.119 | | |
| 12 | 52.71886 | 5.964 | 1.74808 | 52.94 |
| 13 | 152.88037 | DD[13] | | |
| 14 | 290.54416 | 2.665 | 1.43875 | 94.66 |
| 15 | −262.55976 | DD[15] | | |
| 16 | 84.83984 | 1.200 | 1.59522 | 67.73 |
| 17 | 22.01212 | 5.838 | | |
| 18 | −60.55231 | 1.200 | 1.74100 | 52.64 |
| 19 | 62.66885 | 0.590 | | |
| 20 | 43.70235 | 3.744 | 1.80518 | 25.42 |
| 21 | −293.40033 | DD[21] | | |
| 22 | −27.18456 | 1.200 | 1.49700 | 81.54 |
| 23 | −211.67295 | DD[23] | | |
| 24(Stop) | ∞ | 1.550 | | |
| 25 | 112.95222 | 3.599 | 1.71855 | 55.30 |
| 26 | −95.58218 | 0.199 | | |
| 27 | 37.10173 | 7.907 | 1.49700 | 81.54 |
| 28 | −36.93928 | 1.300 | 1.93407 | 24.09 |
| 29 | 520.96761 | 7.003 | | |
| 30 | 60.11914 | 4.675 | 1.84667 | 23.79 |
| 31 | −79.27606 | 0.120 | | |
| 32 | 27.14052 | 6.387 | 1.59282 | 68.62 |
| 33 | −95.02558 | 1.400 | 1.90627 | 37.37 |
| 34 | 21.58292 | 11.494 | | |
| 35 | 85.66741 | 3.698 | 1.54993 | 45.64 |
| 36 | −52.45877 | 3.219 | | |
| 37 | −25.55472 | 1.200 | 1.82646 | 45.35 |
| 38 | −58.29488 | 5.000 | | |
| 39 | ∞ | 2.000 | 1.51633 | 64.14 |
| 40 | ∞ | 26.603 | | |

TABLE 14

Example 5•Specification (d Line)

|  | Wide-Angle End | Telephoto End |
|---|---|---|
| Zoom Ratio | 1.0 | 2.6 |
| f | 51.754 | 134.560 |
| Bf | 32.922 | 32.922 |
| FNo. | 2.750 | 2.752 |
| 2ω [°] | 31.2 | 12.0 |

TABLE 15

Example 5•Variable Surface Distance

|  | Wide-Angle End | Telephoto End |
|---|---|---|
| DD[13] | 8.251 | 28.270 |
| DD[15] | 1.001 | 6.100 |
| DD[21] | 8.894 | 7.529 |
| DD[23] | 24.676 | 0.923 |

Figure 16:
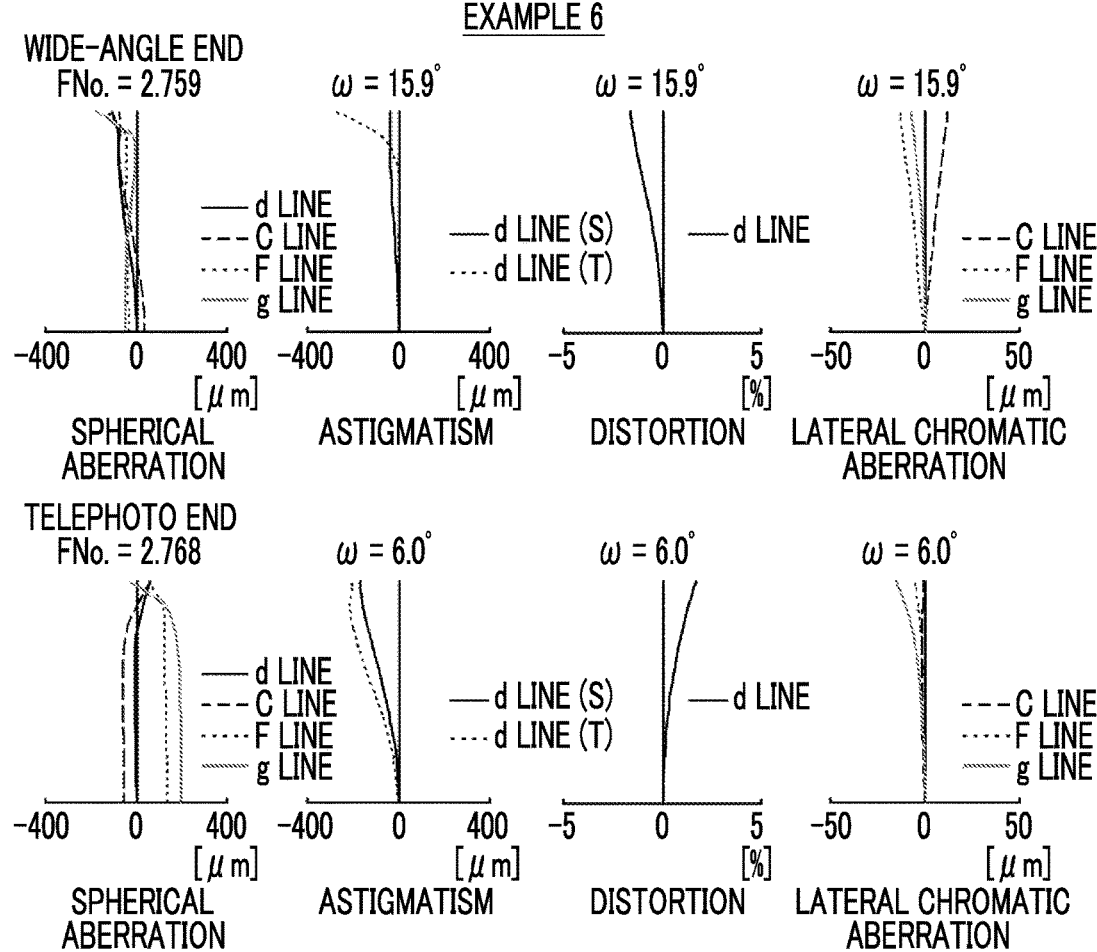
FIG. 16 is a diagram of aberrations of the zoom lens of Example 6 of the present invention.

Next, a zoom lens of Example 6 will be described. FIG. 6 is a cross-sectional view illustrating a lens configuration of the zoom lens of Example 6. Compared with the zoom lens of Example 5, the zoom lens of Example 6 is the same in terms of a configuration of the refractive power of each group and a configuration of the number of lenses of each group except that the fifth lens group G5 is composed of nine lenses L51 to L59. Further, Table 16 shows basic lens data of the zoom lens of Example 6, Table 17 shows data about specification, and Table 18 shows data about variable surface distances. FIG. 16 shows aberration diagrams thereof.

TABLE 16

Example 6•Lens Data(n and ν are based on d line)

| Surface Number | Radius of Curvature | Surface Distance | n | ν |
|---|---|---|---|---|
| 1 | 1398.32322 | 2.200 | 1.48749 | 70.24 |
| 2 | 63.14910 | 1.263 | | |
| 3 | 63.94753 | 3.410 | 1.80518 | 25.42 |
| 4 | 99.22039 | 6.256 | | |
| 5 | −196.67780 | 2.200 | 1.91082 | 35.25 |
| 6 | 507.92605 | 1.108 | | |
| 7 | 283.91953 | 6.515 | 1.49700 | 81.54 |
| 8 | −100.37626 | 11.595 | | |
| 9 | 101.55086 | 2.300 | 1.76145 | 27.08 |
| 10 | 55.57878 | 8.703 | 1.49700 | 81.54 |
| 11 | −980.01504 | 0.120 | | |
| 12 | 60.44557 | 5.616 | 1.68831 | 56.95 |
| 13 | 184.29116 | DD[13] | | |
| 14 | 34.84783 | 7.198 | 1.48749 | 70.24 |
| 15 | −1109.89697 | DD[15] | | |
| 16 | 139.49273 | 0.999 | 1.72916 | 54.68 |
| 17 | 25.18970 | 5.819 | | |
| 18 | −47.30236 | 1.000 | 1.65809 | 56.13 |
| 19 | 31.19045 | 0.826 | | |
| 20 | 34.13619 | 4.473 | 1.82291 | 25.73 |
| 21 | −202.48903 | DD[21] | | |
| 22 | −54.52775 | 0.999 | 1.80260 | 36.79 |
| 23 | 432.28336 | DD[23] | | |
| 24(Stop) | ∞ | 1.549 | | |
| 25 | 142.28787 | 1.770 | 1.84667 | 23.83 |
| 26 | −835.73264 | 0.200 | | |
| 27 | 32.20887 | 9.431 | 1.53775 | 74.70 |
| 28 | −24.40195 | 1.099 | 1.88331 | 27.02 |
| 29 | −265.91809 | 6.283 | | |
| 30 | −19293.77322 | 3.946 | 1.84667 | 23.79 |
| 31 | −38.72408 | 1.000 | | |
| 32 | 33.02507 | 1.100 | 1.95375 | 32.32 |
| 33 | 18.89343 | 8.055 | 1.79062 | 48.94 |
| 34 | 75.90285 | 1.777 | | |

TABLE 16-continued

Example 6•Lens Data(n and ν are based on d line)

| Surface Number | Radius of Curvature | Surface Distance | n | ν |
|---|---|---|---|---|
| 35 | −236.94405 | 3.468 | 1.43875 | 94.66 |
| 36 | −22.63119 | 2.000 | 1.91082 | 35.25 |
| 37 | 33.63848 | 15.942 | | |
| 38 | 48.85612 | 3.036 | 1.88571 | 29.49 |
| 39 | 273.66168 | 0.000 | | |
| 40 | ∞ | 2.300 | 1.51633 | 64.14 |
| 41 | ∞ | 24.611 | | |

TABLE 17

Example 6•Specification (d Line)

| | Wide-Angle End | Telephoto End |
|---|---|---|
| Zoom Ratio | 1.0 | 2.6 |
| f | 51.847 | 134.803 |
| Bf | 26.129 | 26.129 |
| FNo. | 2.759 | 2.768 |
| 2ω [°] | 31.8 | 12.0 |

TABLE 18

Example 6•Variable Surface Distance

| | Wide-Angle End | Telephoto End |
|---|---|---|
| DD[13] | 1.005 | 36.183 |
| DD[15] | 1.459 | 0.524 |
| DD[21] | 3.237 | 2.471 |
| DD[23] | 34.239 | 0.762 |

Figure 17:
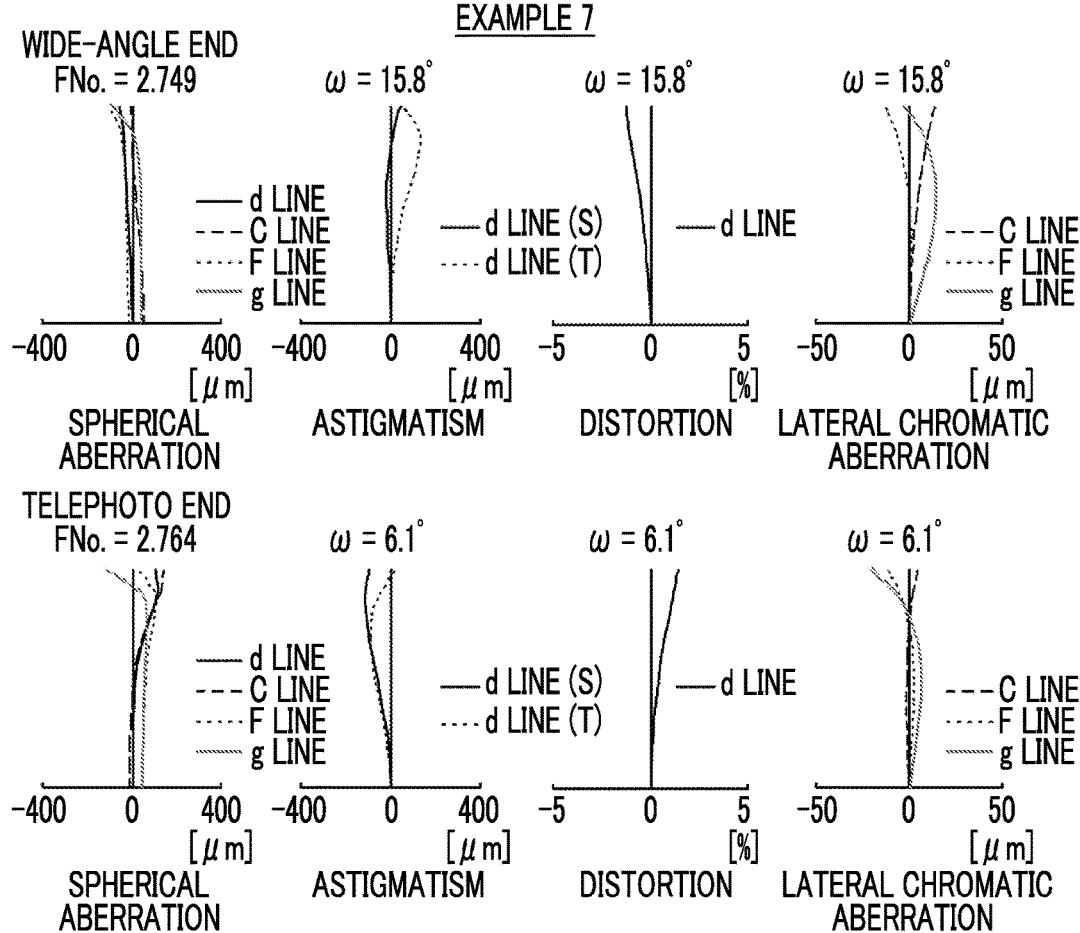
FIG. 17 is a diagram of aberrations of the zoom lens of Example 7 of the present invention.

Next, a zoom lens of Example 7 will be described. FIG. 7 is a cross-sectional view illustrating a lens configuration of the zoom lens of Example 7. Compared with the zoom lens of Example 6, the zoom lens of Example 7 is the same in terms of a configuration of the refractive power of each group and a configuration of the number of lenses of each group. Further, Table 19 shows basic lens data of the zoom lens of Example 7, Table 20 shows data about specification, and Table 21 shows data about variable surface distances. FIG. 17 shows aberration diagrams thereof.

TABLE 19

Example 7•Lens Data(n and ν are based on d line)

| Surface Number | Radius of Curvature | Surface Distance | n | ν |
|---|---|---|---|---|
| 1 | −437.49696 | 2.200 | 1.48749 | 70.24 |
| 2 | 53.00212 | 2.314 | | |
| 3 | 56.12068 | 4.498 | 1.80518 | 25.42 |
| 4 | 101.43950 | 5.525 | | |
| 5 | −251.79787 | 2.200 | 1.91082 | 35.25 |
| 6 | 293.38827 | 0.854 | | |
| 7 | 194.04460 | 7.723 | 1.49700 | 81.54 |
| 8 | −94.83711 | 9.271 | | |
| 9 | 89.44581 | 2.300 | 1.78529 | 25.74 |
| 10 | 47.99611 | 9.861 | 1.49700 | 81.54 |
| 11 | 20662.40443 | 0.120 | | |
| 12 | 66.14819 | 5.346 | 1.66042 | 58.48 |
| 13 | 203.30357 | DD[13] | | |
| 14 | 42.99352 | 6.864 | 1.48749 | 70.24 |
| 15 | −615.74631 | DD[15] | | |
| 16 | 137.57499 | 2.093 | 1.72916 | 54.68 |
| 17 | 29.74855 | 6.239 | | |
| 18 | −66.24496 | 1.001 | 1.62617 | 60.57 |

TABLE 19-continued

Example 7•Lens Data(n and ν are based on d line)

| Surface Number | Radius of Curvature | Surface Distance | n | ν |
|---|---|---|---|---|
| 19 | 35.11754 | 0.941 | | |
| 20 | 37.88097 | 5.017 | 1.81932 | 24.93 |
| 21 | −213.41456 | DD[21] | | |
| 22 | −52.51048 | 0.999 | 1.89254 | 38.75 |
| 23 | 590.54449 | DD[23] | | |
| 24(Stop) | ∞ | 1.549 | | |
| 25 | 125.92581 | 2.702 | 1.84667 | 23.83 |
| 26 | −172.92957 | 0.199 | | |
| 27 | 31.11702 | 9.250 | 1.53775 | 74.70 |
| 28 | −30.34845 | 1.099 | 1.91125 | 28.68 |
| 29 | 156.04210 | 6.793 | | |
| 30 | 1708.93466 | 3.981 | 1.84667 | 23.79 |
| 31 | −41.03903 | 1.002 | | |
| 32 | 34.02331 | 4.868 | 1.99905 | 19.61 |
| 33 | 16.83638 | 4.846 | 1.78952 | 42.52 |
| 34 | 74.60924 | 1.715 | | |
| 35 | −400.16700 | 4.670 | 1.43875 | 94.66 |
| 36 | −25.45485 | 1.000 | 1.95375 | 32.32 |
| 37 | 28.35071 | 12.799 | | |
| 38 | 45.11234 | 3.987 | 1.87650 | 21.26 |
| 39 | −750.24384 | 0.000 | | |
| 40 | ∞ | 2.300 | 1.51633 | 64.14 |
| 41 | ∞ | 26.174 | | |

TABLE 20

Example 7•Specification (d Line)

| | Wide-Angle End | Telephoto End |
|---|---|---|
| Zoom Ratio | 1.0 | 2.6 |
| f | 51.843 | 134.791 |
| Bf | 27.691 | 27.691 |
| FNo. | 2.749 | 2.764 |
| 2ω [°] | 31.6 | 12.2 |

TABLE 21

Example 7•Variable Surface Distance

| | Wide-Angle End | Telephoto End |
|---|---|---|
| DD[13] | 1.365 | 35.187 |
| DD[15] | 0.999 | 2.038 |
| DD[21] | 3.333 | 7.864 |
| DD[23] | 40.540 | 1.149 |

Figure 18:
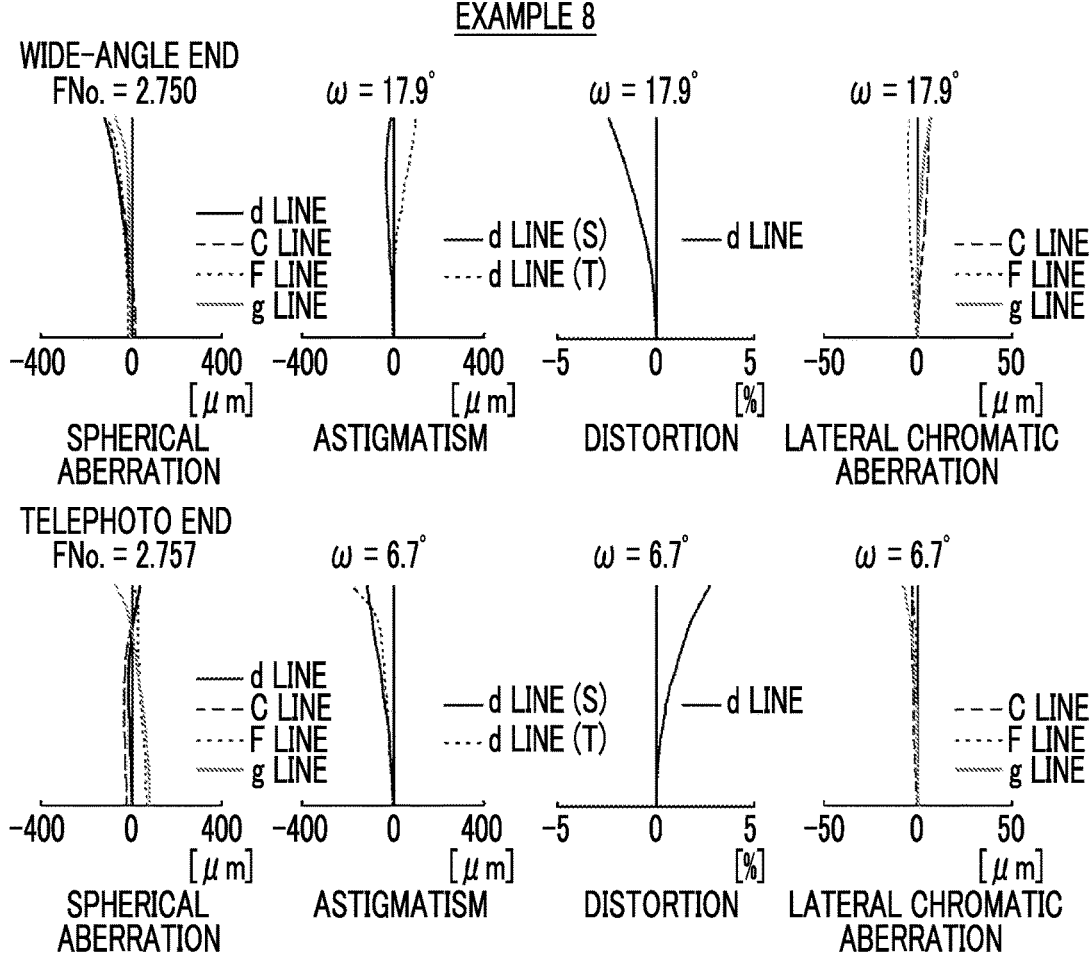
FIG. 18 is a diagram of aberrations of the zoom lens of Example 8 of the present invention.

Next, a zoom lens of Example 8 will be described. FIG. 8 is a cross-sectional view illustrating a lens configuration of the zoom lens of Example 8. Compared with the zoom lens of Example 2, the zoom lens of Example 8 is the same in terms of a configuration of the refractive power of each group and a configuration of the number of lenses of each group. Further, Table 22 shows basic lens data of the zoom lens of Example 8, Table 23 shows data about specification, and Table 24 shows data about variable surface distances. FIG. 18 shows aberration diagrams thereof.

TABLE 22

Example 8•Lens Data(n and ν are based on d line)

| Surface Number | Radius of Curvature | Surface Distance | n | ν |
|---|---|---|---|---|
| 1 | 395.08456 | 2.000 | 1.51680 | 64.20 |
| 2 | 52.44829 | 1.268 | | |

TABLE 22-continued

Example 8•Lens Data(n and ν are based on d line)

| Surface Number | Radius of Curvature | Surface Distance | n | ν |
|---|---|---|---|---|
| 3 | 51.43821 | 4.112 | 1.84661 | 23.88 |
| 4 | 84.39720 | 6.479 | | |
| 5 | −187.61370 | 2.000 | 1.83481 | 42.72 |
| 6 | 168.80701 | 2.422 | | |
| 7 | 216.97549 | 6.221 | 1.49700 | 81.54 |
| 8 | −90.71817 | 8.728 | | |
| 9 | 77.46538 | 2.200 | 1.84667 | 23.79 |
| 10 | 45.20239 | 8.952 | 1.43875 | 94.66 |
| 11 | 2396.89319 | 0.121 | | |
| 12 | 56.91142 | 6.847 | 1.72916 | 54.68 |
| 13 | 616.18294 | DD[13] | | |
| 14 | −234.30428 | 1.201 | 1.91082 | 35.25 |
| 15 | 33.98105 | 4.549 | | |
| 16 | −32.43369 | 1.234 | 1.49700 | 81.54 |
| 17 | 48.47752 | 0.536 | | |
| 18 | 52.65976 | 3.798 | 1.89286 | 20.36 |
| 19 | −287.80793 | 1.210 | 1.85478 | 24.80 |
| 20 | −526.16380 | DD[20] | | |
| 21 | 195.84851 | 3.374 | 1.95375 | 32.32 |
| 22 | −88.73565 | 0.200 | | |
| 23 | 123.00977 | 5.157 | 1.59282 | 68.62 |
| 24 | −40.94393 | 1.200 | 1.78472 | 25.68 |
| 25 | 2424.86514 | DD[25] | | |
| 26(Stop) | ∞ | 3.704 | | |
| 27 | 32.52003 | 10.733 | 1.43875 | 94.66 |
| 28 | −32.42250 | 1.201 | 1.73400 | 51.47 |
| 29 | 162.54442 | 3.665 | | |
| 30 | 208.51898 | 4.669 | 1.66680 | 33.05 |
| 31 | −43.30024 | 1.613 | | |
| 32 | 31.87117 | 5.745 | 1.60300 | 65.44 |
| 33 | −109.55693 | 1.200 | 1.91082 | 35.25 |
| 34 | 26.07226 | 7.292 | | |
| 35 | 45.56933 | 2.566 | 1.90366 | 31.31 |
| 36 | 111.24945 | 4.697 | | |
| 37 | −22.03449 | 1.201 | 1.48749 | 70.24 |
| 38 | −30.32928 | 5.000 | | |
| 39 | ∞ | 2.000 | 1.51633 | 64.14 |
| 40 | ∞ | 28.380 | | |

TABLE 23

Example 8•Specification (d Line)

| | Wide-Angle End | Telephoto End |
|---|---|---|
| Zoom Ratio | 1.0 | 2.6 |
| f | 46.017 | 120.564 |
| Bf | 28.380 | 28.380 |
| FNo. | 2.750 | 2.757 |
| 2ω [°] | 35.8 | 13.4 |

TABLE 24

Example 8•Variable Surface Distance

| | Wide-Angle End | Telephoto End |
|---|---|---|
| DD[13] | 11.112 | 42.662 |
| DD[20] | 24.682 | 1.223 |
| DD[25] | 13.468 | 5.377 |

Figure 19:
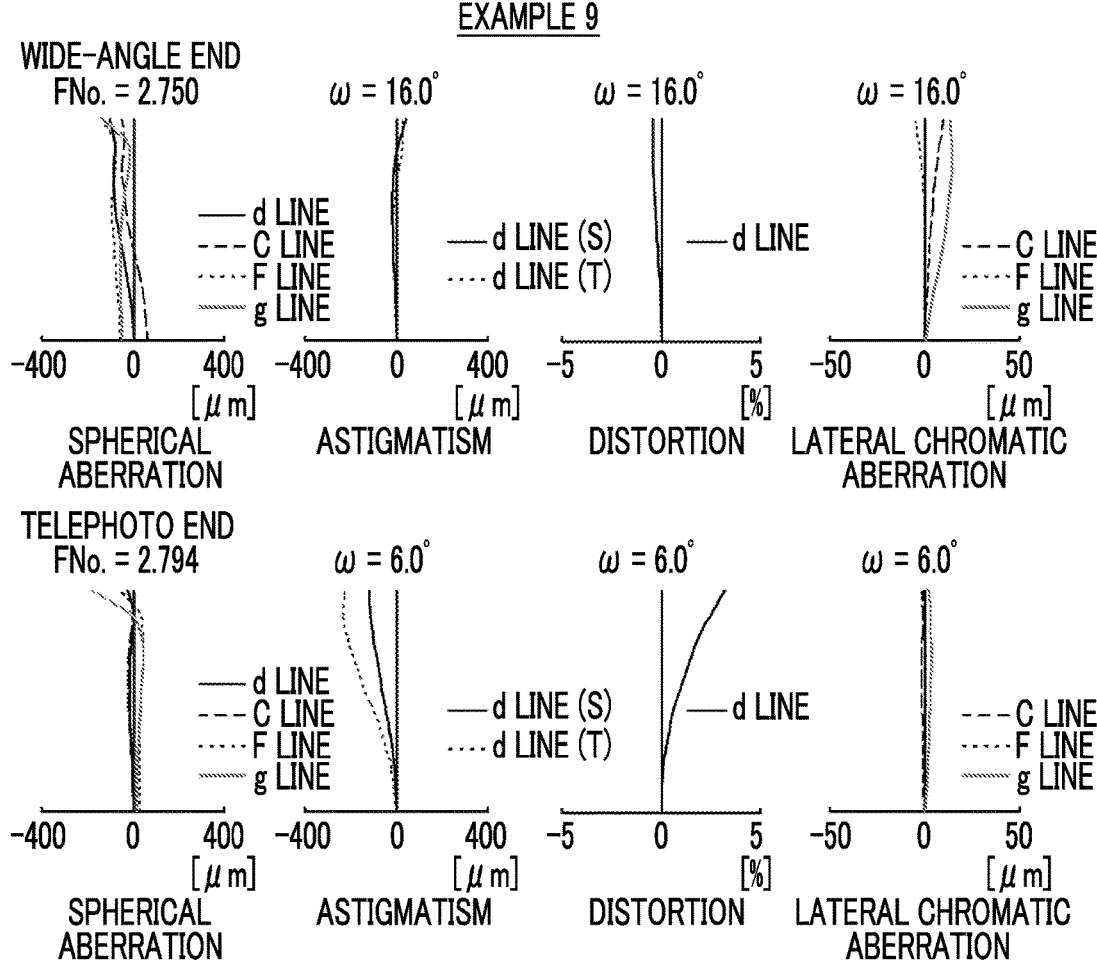
FIG. 19 is a diagram of aberrations of the zoom lens of Example 9 of the present invention.

Next, a zoom lens of Example 9 will be described. FIG. 9 is a cross-sectional view illustrating a lens configuration of the zoom lens of Example 9. Compared with the zoom lens of Example 4, the zoom lens of Example 9 is the same in terms of a configuration of the refractive power of each group and a configuration of the number of lenses of each group. Further, Table 25 shows basic lens data of the zoom lens of Example 9, Table 26 shows data about specification, and Table 27 shows data about variable surface distances. FIG. 19 shows aberration diagrams thereof.

TABLE 25

Example 9•Lens Data(n and ν are based on d line)

| Surface Number | Radius of Curvature | Surface Distance | n | ν |
|---|---|---|---|---|
| 1 | 363.08525 | 2.300 | 1.78800 | 47.37 |
| 2 | 101.66332 | 0.120 | | |
| 3 | 62.02877 | 2.887 | 1.92286 | 18.90 |
| 4 | 83.96452 | 6.776 | | |
| 5 | −135.22234 | 2.100 | 1.51633 | 64.14 |
| 6 | 114.55233 | 1.776 | | |
| 7 | 170.96905 | 6.681 | 1.43875 | 94.66 |
| 8 | −96.47431 | 10.347 | | |
| 9 | 114.86379 | 2.200 | 1.80518 | 25.42 |
| 10 | 48.32907 | 9.736 | 1.43875 | 94.66 |
| 11 | −322.37322 | 0.119 | | |
| 12 | 54.82629 | 6.007 | 1.77250 | 49.60 |
| 13 | 221.17636 | DD[13] | | |
| 14 | −1427.24380 | 2.497 | 1.43875 | 94.66 |
| 15 | −131.79407 | DD[15] | | |
| 16 | 39.73419 | 1.200 | 1.49700 | 81.54 |
| 17 | 26.84930 | 4.516 | | |
| 18 | −196.20856 | 1.200 | 1.87806 | 40.19 |
| 19 | 352.89386 | 2.218 | | |
| 20 | −92.38609 | 1.210 | 1.59522 | 67.73 |
| 21 | 50.29236 | 2.353 | 1.84666 | 23.78 |
| 22 | 149.22371 | DD[22] | | |
| 23 | −34.08533 | 1.200 | 1.90043 | 37.37 |
| 24 | 46.13305 | 4.585 | 1.80518 | 25.43 |
| 25 | −70.88486 | DD[25] | | |
| 26(Stop) | ∞ | 1.549 | | |
| 27 | 103.40481 | 3.961 | 1.56883 | 56.04 |
| 28 | −89.72209 | 0.199 | | |
| 29 | 35.68995 | 8.319 | 1.49700 | 81.54 |
| 30 | −36.82820 | 1.500 | 1.80518 | 25.42 |
| 31 | 193.13725 | 7.207 | | |
| 32 | 51.67600 | 4.775 | 1.84667 | 23.79 |
| 33 | −92.84363 | 0.120 | | |
| 34 | 23.86974 | 6.597 | 1.60311 | 60.64 |
| 35 | −101.99595 | 2.000 | 1.95375 | 32.32 |
| 36 | 19.23507 | 11.494 | | |
| 37 | 92.37197 | 3.190 | 1.62004 | 36.26 |
| 38 | −52.37542 | 1.220 | | |
| 39 | −26.87168 | 1.200 | 1.78800 | 47.37 |
| 40 | −101.51550 | 5.000 | | |
| 41 | ∞ | 2.000 | 1.51633 | 64.14 |
| 42 | ∞ | 27.075 | | |

TABLE 26

Example 9•Specification (d Line)

| | Wide-Angle End | Telephoto End |
|---|---|---|
| Zoom Ratio | 1.0 | 2.6 |
| f | 50.794 | 133.081 |
| Bf | 27.074 | 27.074 |
| FNo. | 2.750 | 2.794 |
| 2ω [°] | 32.0 | 12.0 |

TABLE 27

Example 9•Variable Surface Distance

| | Wide-Angle End | Telephoto End |
|---|---|---|
| DD[13] | 7.308 | 30.377 |
| DD[15] | 0.999 | 7.890 |
| DD[22] | 12.294 | 6.663 |
| DD[25] | 25.445 | 1.116 |

Figure 20:
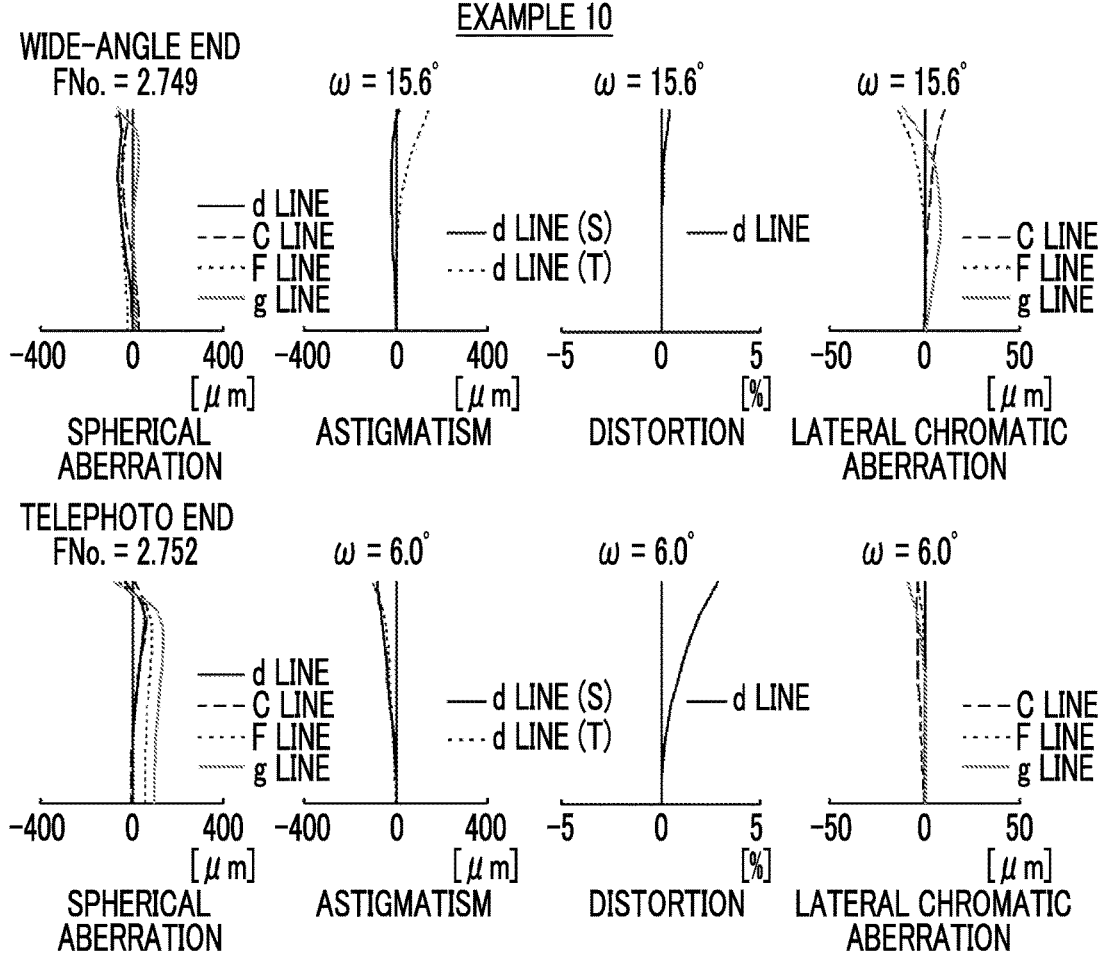
FIG. 20 is a diagram of aberrations of the zoom lens of Example 10 of the present invention.

Next, a zoom lens of Example 10 will be described. FIG. 10 is a cross-sectional view illustrating a lens configuration of the zoom lens of Example 10. Compared with the zoom lens of Example 5, the zoom lens of Example 10 is the same in terms of a configuration of the refractive power of each group and a configuration of the number of lenses of each group. Further, Table 28 shows basic lens data of the zoom lens of Example 10, Table 29 shows data about specification, and Table 30 shows data about variable surface distances. FIG. 20 shows aberration diagrams thereof.

TABLE 28

Example 10•Lens Data(n and ν are based on d line)

| Surface Number | Radius of Curvature | Surface Distance | n | ν |
|---|---|---|---|---|
| 1 | 84.33302 | 2.300 | 1.49700 | 81.54 |
| 2 | 46.47702 | 1.245 | | |
| 3 | 45.50220 | 2.939 | 1.92286 | 20.88 |
| 4 | 56.56331 | 9.512 | | |
| 5 | −169.71090 | 2.300 | 1.90265 | 35.72 |
| 6 | 267.61830 | 1.090 | | |
| 7 | 176.97175 | 7.055 | 1.43875 | 94.66 |
| 8 | −108.07583 | 12.813 | | |
| 9 | 81.86593 | 2.200 | 1.80518 | 25.42 |
| 10 | 46.46573 | 10.018 | 1.43875 | 94.66 |
| 11 | −495.05900 | 0.119 | | |
| 12 | 54.03392 | 5.821 | 1.74808 | 52.94 |
| 13 | 182.13623 | DD[13] | | |
| 14 | 219.25407 | 2.670 | 1.43875 | 94.66 |
| 15 | −269.90546 | DD[15] | | |
| 16 | 86.81531 | 1.200 | 1.59536 | 65.33 |
| 17 | 22.16664 | 5.913 | | |
| 18 | −58.24121 | 1.200 | 1.74431 | 53.57 |
| 19 | 63.12221 | 0.708 | | |
| 20 | 44.76345 | 3.702 | 1.80518 | 25.42 |
| 21 | −245.08708 | DD[21] | | |
| 22 | −27.41677 | 1.200 | 1.49700 | 81.54 |
| 23 | −228.52236 | DD[23] | | |
| 24(Stop) | ∞ | 1.549 | | |
| 25 | 113.98776 | 3.527 | 1.71855 | 55.30 |
| 26 | −92.98804 | 0.199 | | |
| 27 | 36.95164 | 7.753 | 1.49700 | 81.54 |
| 28 | −36.99799 | 1.300 | 1.93407 | 24.09 |
| 29 | 500.91063 | 7.477 | | |
| 30 | 59.75851 | 4.610 | 1.84667 | 23.79 |
| 31 | −79.40423 | 0.120 | | |

TABLE 28-continued

Example 10•Lens Data(n and ν are based on d line)

| Surface Number | Radius of Curvature | Surface Distance | n | ν |
|---|---|---|---|---|
| 32 | 27.49180 | 6.385 | 1.59282 | 68.62 |
| 33 | −90.28915 | 1.400 | 1.90627 | 37.37 |
| 34 | 21.75573 | 11.494 | | |
| 35 | 85.84535 | 3.702 | 1.54993 | 45.64 |
| 36 | −50.12489 | 3.179 | | |
| 37 | −25.65613 | 1.200 | 1.82646 | 45.35 |
| 38 | −61.80456 | 5.000 | | |
| 39 | ∞ | 2.000 | 1.51633 | 64.14 |
| 40 | ∞ | 26.455 | | |

TABLE 29

Example 10•Specification (d Line)

| | Wide-Angle End | Telephoto End |
|---|---|---|
| Zoom Ratio | 1.0 | 2.6 |
| f' | 51.717 | 134.463 |
| Bf | 26.454 | 26.454 |
| FNo. | 2.749 | 2.752 |
| 2ω [°] | 31.2 | 12.0 |

TABLE 30

Example 10•Variable Surface Distance

| | Wide-Angle End | Telephoto End |
|---|---|---|
| DD[13] | 8.565 | 28.589 |
| DD[15] | 1.000 | 6.243 |
| DD[21] | 8.920 | 7.349 |
| DD[23] | 24.682 | 0.986 |

Table 31 shows values corresponding to Conditional Expressions (1) to (6) of the zoom lenses of Examples 1 to 10. It should be noted that, in the above-mentioned examples, the d line is set as the reference wavelength, and the values shown in Table 31 are values at the reference wavelength.

TABLE 31

| Conditional Expression | Example 1 | Example 2 | Example 3 | Example 4 | Example 5 |
|---|---|---|---|---|---|
| (1) Gv1an/Nud1an | 0.035 | 0.035 | 0.035 | 0.035 | 0.035 |
| (2) f1c/f1 | 0.952 | 0.930 | 0.941 | 0.906 | 0.940 |
| (3) f1a/f1b | −0.781 | −0.686 | −0.781 | −0.678 | −0.728 |
| (4) f1a/f1 | −1.138 | −1.096 | −1.040 | −1.113 | −1.332 |
| (5) f1a1/f1a | 1.626 | 1.382 | 1.362 | 1.397 | 1.625 |
| (6) G1a_ave_dn | 2.35 | 1.96 | 1.47 | 2.28 | 2.28 |

| Conditional Expression | Example 6 | Example 7 | Example 8 | Example 9 | Example 10 |
|---|---|---|---|---|---|
| (1) Gv1an/Nud1an | 0.035 | 0.035 | 0.039 | 0.039 | 0.044 |
| (2) f1c/f1 | 0.949 | 0.940 | 0.927 | 0.930 | 0.935 |
| (3) f1a/f1b | −0.716 | −0.726 | −0.682 | −0.718 | −0.731 |
| (4) f1a/f1 | −1.112 | −0.837 | −1.084 | −1.094 | −1.328 |
| (5) f1a1/f1a | 1.264 | 1.031 | 1.327 | 1.770 | 1.887 |
| (6) G1a_ave_dn | 2.28 | 2.28 | 3.65 | 3.59 | −0.54 |

As can be seen from the above-mentioned data, each of the zoom lenses of Examples 1 to 10 is configured as a middle-telephoto-type zoom lens which satisfies Conditional Expressions (1) to (6) and has a total angle of view of about 30° to 10°. Thereby, reduction in weight and size is achieved and high optical performance is achieved while the change in angle of view during focusing is suppressed.

Figure 21:
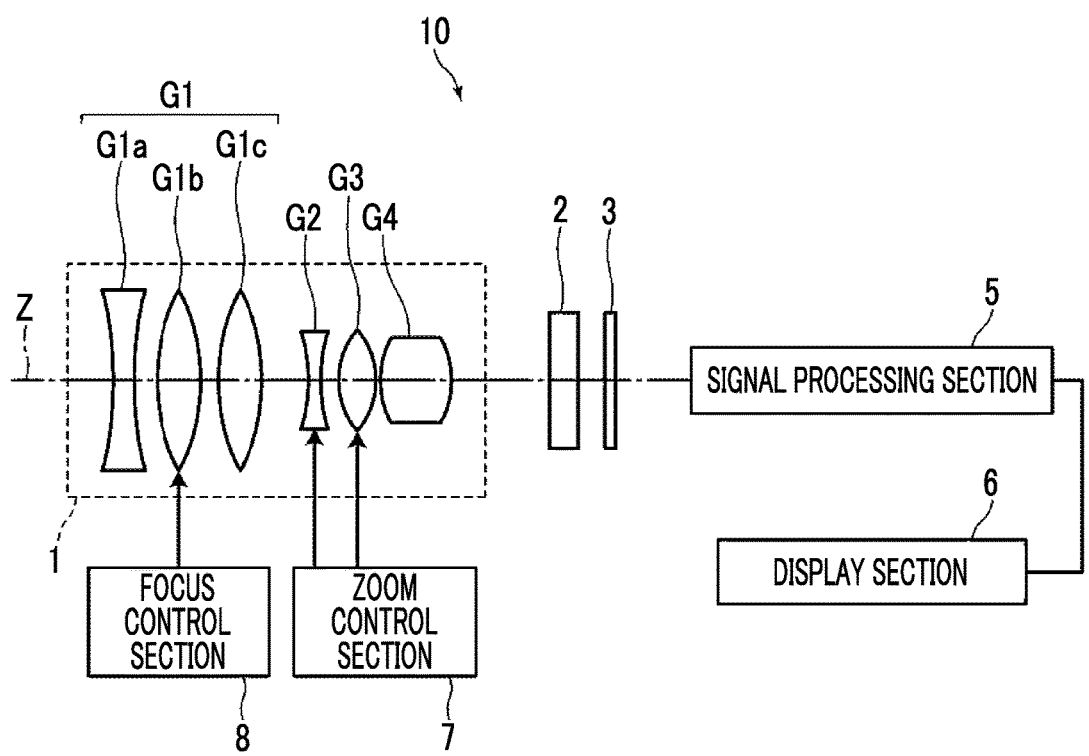
FIG. 21 is a schematic configuration diagram of an imaging apparatus according to an embodiment of the present invention.

Next, an imaging apparatus according to an embodiment of the present invention will be described. FIG. 21 is a schematic configuration diagram of an imaging apparatus 10 using the zoom lens 1 according to the above-mentioned embodiment of the present invention as an example of an imaging apparatus of an embodiment of the present invention. Examples of the imaging apparatus 10 include a movie imaging camera, a broadcast camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. FIG. 21 schematically shows the first-a lens group G1a, the first-b lens group G1b, the first-c lens group G1c, and the second to fourth lens groups G2 to G4 included in the zoom lens 1.

The imaging element 3 captures an image of a subject, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, a zoom control section 7 which controls zooming of the zoom lens 1, and a focus control section 8 which controls focusing of the zoom lens 1. It should be noted that FIG. 21 shows only one imaging element 3, but the imaging apparatus of the present invention is not limited to this, and may be a so-called three-plate imaging apparatus having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens are not limited to the values shown in the numerical examples, and different values may be used therefor.

EXPLANATION OF REFERENCES

1: zoom lens
2: filter
3: imaging element
5: signal processing section
6: display section
7: zoom control section
8: focus control section
10: imaging apparatus
G1: first lens group
G1a: first-a lens group
G1b: first-b lens group
G1c: first-c lens group
G2: second lens group
G3: third lens group
G4: fourth lens group
G5: fifth lens group
L11 to L59: lens
PP: optical member
Sim: image plane
St: aperture stop
ta, wa: on-axis rays
tb, wb: rays with maximum angle of view
Z: optical axis

What is claimed is:

1. A zoom lens consisting of, in order from an object side:
a first lens group that remains stationary with respect to an image plane during zooming and has a positive refractive power;
at least two movable lens groups that are moved by changing distances between the movable lens groups and adjacent groups in a direction of an optical axis during zooming; and
a final lens group that remains stationary with respect to the image plane during zooming and has a positive refractive power,
wherein the first lens group consists of, in order from the object side, a first-a lens group that has a negative refractive power and remains stationary with respect to the image plane during focusing, a first-b lens group that has a positive refractive power and is moved by changing a distance in the direction of the optical axis between the first-b lens group and an adjacent lens group during focusing, and a first-c lens group that has a positive refractive power and remains stationary with respect to the image plane during focusing,
wherein the first-a lens group consists of, in order from the object side, a first lens that has a negative refractive power, a second lens that is convex toward the object side and has a positive refractive power, and a third lens that has a negative refractive power,
wherein assuming that a specific gravity of the lens having the negative refractive power in the first-a lens group is Gv1an and an Abbe number of the lens having the negative refractive power in the first-a lens group at a d line is Nud1an, at least one of the first lens or the third lens satisfies Conditional Expression (1), $$0.03 < Gv1an/Nud1an < 0.06 \quad (1),$$

and
wherein assuming that a focal length of the first-c lens group is f1c and a focal length of the first lens group is f1, Conditional Expression (2) is satisfied $$0.8 < f1c/f1 < 1 \quad (2).$$

2. The zoom lens according to claim 1,
wherein assuming that a focal length of the first-a lens group is f1a and a focal length of the first-b lens group is f1b, Conditional Expression (3) is satisfied $$-0.9 < f1a/f1b < -0.5 \quad (3).$$

3. The zoom lens according to claim 1,
wherein assuming that a focal length of the first-a lens group is f1a, Conditional Expression (4) is satisfied $$-1.5 < f1a/f1 < -0.8 \quad (4).$$

4. The zoom lens according to claim 1,
wherein assuming that a focal length of the first lens is f1a1 and a focal length of the first-a lens group is f1a, Conditional Expression (5) is satisfied $$0.9 < f1a1/f1a < 1.9 \quad (5).$$

5. The zoom lens according to claim 1,
wherein assuming that an average value of dn/dt as a temperature coefficient of a refractive index of the lens having the negative refractive power in the first-a lens group at the d line is G1an_ave_dn, Conditional Expression (6) is satisfied $$-1.5 < G1an\_ave\_dn < 3.8 \quad (6).$$

6. The zoom lens according to claim 1,
wherein the at least two movable lens groups consist of, in order from the object side, a second lens group that has a negative refractive power and a third lens group that has a positive refractive power.

7. The zoom lens according to claim 1,
wherein the at least two movable lens groups consist of, in order from the object side, a second lens group that has a positive refractive power, a third lens group that has a negative refractive power, and a fourth lens group that has a negative refractive power.

8. The zoom lens according to claim 1,
wherein at least one lens of the first lens and the third lens satisfies Conditional Expression (1-1)

$$0.032 < Gv1an/Nud1an < 0.045 \quad (1\text{-}1).$$

9. The zoom lens according to claim 1,
wherein Conditional Expression (2-1) is satisfied $$0.9 < f1c/f1 < 0.96 \quad (2\text{-}1).$$

10. The zoom lens according to claim 2,
wherein Conditional Expression (3-1) is satisfied $$-0.79 < f1a/f1b < -0.67 \quad (3\text{-}1).$$

11. The zoom lens according to claim 3,
wherein Conditional Expression (4-1) is satisfied $$-1.2 < f1a/f1 < -1 \quad (4\text{-}1).$$

12. The zoom lens according to claim 4,
wherein Conditional Expression (5-1) is satisfied $$1.02 < f1a1/f1a < 1.63 \quad (5\text{-}1).$$

13. The zoom lens according to claim 5,
wherein Conditional Expression (6-1) is satisfied $$-1 < G1an\_ave\_dn < 3 \quad (6\text{-}1).$$

14. An imaging apparatus comprising the zoom lens according to claim 1.

* * * * *